United States Patent
Wu et al.

(10) Patent No.: US 9,391,850 B2
(45) Date of Patent: Jul. 12, 2016

(54) METHOD AND APPARATUS FOR QUALITY-OF-SERVICE (QOS) MANAGEMENT

(75) Inventors: Zong Liang Wu, San Diego, CA (US); Anton Monk, San Diego, CA (US)

(73) Assignee: ENTROPIC COMMUNICATIONS, LLC, Carlsbad, CA (US)

(*) Notice: Subject to any disclaimer, the term of this patent is extended or adjusted under 35 U.S.C. 154(b) by 908 days.

(21) Appl. No.: 13/076,387

(22) Filed: Mar. 30, 2011

(65) Prior Publication Data

US 2012/0250506 A1 Oct. 4, 2012

(51) Int. Cl.
*H04L 12/24* (2006.01)

(52) U.S. Cl.
CPC ................... *H04L 41/5054* (2013.01)

(58) Field of Classification Search
USPC ........................................ 370/231; 709/240
See application file for complete search history.

(56) References Cited

U.S. PATENT DOCUMENTS

| 8,189,470 B2* | 5/2012 | Nakashima et al. ........ 370/231 |
| 2007/0064604 A1 | 3/2007 | Chen et al. |
| 2007/0211631 A1* | 9/2007 | Rahman et al. ............. 370/230 |
| 2007/0286074 A1* | 12/2007 | Xu ............................... 370/230 |
| 2008/0212591 A1* | 9/2008 | Wu et al. ................. 370/395.21 |

FOREIGN PATENT DOCUMENTS

CN 101632266 1/2010

* cited by examiner

*Primary Examiner* — Hassan Kizou
*Assistant Examiner* — Ashil Farahmand
(74) *Attorney, Agent, or Firm* — McAndrews, Held & Malloy, Ltd.

(57) ABSTRACT

The disclosed method and apparatus provides systems, methods, and apparatuses for implementing a PQoS flow between two or more nodes located in different network segments of a multi-segment network, when some nodes involved in the flow lack support for high layer QoS management protocols. Specifically, some embodiments are directed toward implementing a PQoS flow involving some nodes that lack network layers higher than a Data Link Layer (layer 2). For example, some embodiments of the current disclosed method and apparatus can create a parameterized QoS flow between a source node and a destination node when at least one of the nodes participating in the flow (i.e. the source node, one or multiple bridge nodes that the QoS flow passes, and the destination node) lacks UPnP QoS Device Services (i.e., a higher layer QoS management protocol).

9 Claims, 17 Drawing Sheets

METHOD AND APPARATUS FOR QUALITY-OF-SERVICE (QOS) MANAGEMENT

FIELD OF THE DISCLOSED METHOD AND APPARATUS

The disclosed method and apparatus relates generally to communication networks, and more particularly, some embodiments relate to Quality-of-Service setup and management for networks.

DESCRIPTION OF THE RELATED ART

A home network may include several types of devices that provide subscriber services throughout a home. These subscriber services include delivering multimedia content, such as streaming audio and video, to devices located throughout the home. As the number of available subscriber services has increased and they become more popular, the number of devices being connected within each home network has also increased. The increase in the number of services and devices increases the complexity of coordinating communication between the network nodes. This increase also generally tends to increase the amount of traffic carried on the network.

The network of FIG. 1 is one example of a Multimedia over Coax Alliance (MoCA) network implemented in a home. In this example, a wired communications medium 100 is shown. The wired communications medium 100 might be a coaxial cable system, a power line system, a fiber optic cable system, an Ethernet cable system, or other similar communications medium. Alternatively, the communications medium 100 might be a wireless transmission system. In one embodiment of FIG. 1, the communications medium 100 is preinstalled coaxial cabling deployed within a residence 101.

The network of FIG. 1 comprises a plurality of network nodes 102, 103, 104, 105, 106 in communication according to a communications protocol. For example, the communications protocol might conform to a networking standard, such as the well known MoCA standard. In the example of FIG. 1, the communications protocol specifies a packet based communications system.

In some cases, activity on the network is controlled by a Network Coordinator (NC). In such networks, the NC manages access to the shared communications medium and manages the "quality-of-service" (QoS) of transmissions on the network. QoS generally refers to the reliability of the access to the medium that devices attempting to transmit information on the network will have.

In one case, one of the nodes is selected to perform the functions of the NC based upon a process defined by the communications protocol. For example, in a MoCA network, the first node to communicate over a communication medium will search to see whether any other node is already performing the functions of the NC. Being the first node, there will not be another node yet on the network. Accordingly, the first node will become the NC. When a second node does a similar search, the first node will be sending out a beacon that will be detected by the second node. An admission process will occur between the nodes according to the admission procedures of the MoCA protocol. The result of the admission process will be the admission of the second node to the network. The NC also performs admission procedures as each other new node requests admission to the network. In one such case, after two or more nodes form the network, a protocol is used to select which node will continue to function as the NC by using a set of well defined criteria.

In some networks employing an NC, the NC schedules network communications between network nodes using a Media Access Plan (MAP). The MAP is sent as a packet. Such MAP packets are sent on a regular basis. MAPs schedule all of the traffic on the medium 100. That includes scheduling the times during which nodes can transmit. Transmit times for data packets are scheduled by the NC in response to reservation requests (RRs) by the nodes of the network. The NC may also schedule control and management packets on its own (without receiving a RR from another node).

With continued reference to FIG. 1, one of the nodes 102 serves as a network communications module (e.g., a MoCA node). The node 102 is coupled to one of the computers 109. Such nodes 102 allow the computers 109 to communicate on the communications medium 100 in accordance with the communications protocol used on the medium 100. One node 106 is shown as a module associated with a television 111 to allow the television 111 to receive and display media streamed from one or more other network nodes. Alternatively, a node can be associated with (i.e., coupled to or integrated into) a speaker or other music or video device 103. A node can also be associated with a module configured to interface with an internet or cable service provider 112, for example to provide Internet access, digital video recording capabilities, media streaming functions, or network management services to the residence 101.

Referring once again to a MoCA network as an example, a centralized NC sets up network communications among the nodes. Each unidirectional traffic stream of data packets is identified by a "Flow ID." For the purposes of this disclosure, a "flow" is a communication of information organized as a stream of packets transmitted between a transmitting node and at least one receiving node. A flow will typically include a set of related information to be communicated from the transmitting node to the receiving node. The information may be a digital stream of data representing the entire content of a movie to be displayed on a television or other video monitor. The entire stream of data used to stream the movie may be associated with one flow. A unique flow ID is assigned to the flow and is associated with all of the packets required to be transmitted from a transmitting node 102 to a receiving node 106 to stream the content of the movie to the receiving node 106 (i.e., all of the packets of the flow).

The transmitting node 102 may set up as many flows as the node 102 requires to communicate with the other nodes of the network. For example, a second flow may be concurrently set up between the node 102 and another node 105 to allow a document to be sent from the personal computer 109 to the personal computer 110.

Some home networks specify QoS parameters to ensure that an appropriate priority is set for the communications that occur on the network. QoS parameters can also be used to ensure that sufficient resources are allocated to the communication of user content without undesirable interruptions or delays. For example, a user that is playing a video game will only have a desirable experience if the commands that he provides are communicated to the game console and then displayed on the monitor or television rapidly. Delays in implementing such gaming commands can significantly impair the quality of the experience. Accordingly, the use of QoS parameters and protocols can help ensure a satisfactory user experience while ensuring that resources are not unnecessarily expended on communicating information more rapidly than is necessary if the content has a high tolerance for latency (i.e., delay).

In a home network, QoS can be classified into two main categories: Prioritized QoS and Parameterized QoS (PQoS).

Each Prioritized QoS flow is assigned a priority by the node sending the flow. Those flows that are in the group having the highest priority are transmitted before flows having a lower priority. Prioritized QoS flows are not guaranteed to get the resources necessary to ensure that packets of the flows are transmitted.

In contrast to Prioritized QoS, PQoS provides a quantified measure of quality that is defined by a "Traffic Specification" (TSPEC) for each flow. The TSPEC of a PQoS flow defines the requirements and parameters of the flow. The TSPEC of a PQoS flow typically includes information such as Peak Rate, Maximum Packet Size, etc. For example, in a MoCA network in which PQoS is implemented, the Peak Rate parameter indicates the maximum amount of data (in bytes) that will need to be transmitted in a particular interval (e.g., a MAP cycle).

Unlike a Prioritized QoS flow, each PQoS flow must first go through a formal PQoS flow admission process before transmission of any data packets can begin. The PQoS flow admission process allows all the nodes involved in the flow to reserve appropriate node level resources (like buffers) and network level resources (like network transmission time and timeliness of such transmissions), in order to guarantee the quality of the service (i.e., that the parameters associated with the TSPEC can be met). This ensures that the resources required by the PQoS flows will be available when needed during the actual data packet transmission phase. Once a PQoS flow is "admitted," the resources necessary to transmit the entire flow from the transmitting node to one or more receiving nodes timely are guaranteed. If a PQoS flow is rejected after the PQoS flow admission process, the PQoS flow cannot be started. Since resources are not guaranteed for Prioritized QoS flows, a node can always down-grade a rejected PQoS flow to a Prioritized QoS flow, and start transmitting the flow at a Prioritized QoS level.

In networks employing an NC, the data packet transmission phase of a PQoS flow is the phase during which the transmit node actually makes RRs for individual data packets or groups of data packets of the flow. In addition, during the data packet transmission phase the NC either grants the request (which is guaranteed for packets of a PQoS flow) or discards the RR, depending on the availability of network bandwidth for this request. It should be noted that for the purpose of this description, "grants a request" means that the NC assigns a transmission slot to the packet associated with the RR to allow the node that generated the request to transmit the associated packet during the assigned transmission slot in the next MAP cycle. The NC then transmits a MAP to indicate the schedule to all of the nodes of the network, including the requesting node. Each requesting node then transmits the packets according to the schedule indicated by the MAP. Further details regarding MAPs and RRs are provided below.

Among PQoS flows, each flow may be assigned a priority (similar to a prioritized QoS flow) in order to create further differentiation among the various PQoS flows. However, even if assigned a low relative priority, PQoS flows will always be transmitted before non-PQoS flows, such as prioritized QoS flows, if the bandwidth reserved for PQoS flows has not been completely used by other PQoS flows. If there is insufficient bandwidth reserved for PQoS flows to transmit all of the PQoS packets to be transmitted, then those packets associated with PQoS flows that have higher priorities will be transmitted first.

In networks employing an NC, in order for the NC to guarantee the availability of all of the resources that are required to support all of the admitted PQoS flows, the NC must determine how much bandwidth will be required by each PQoS flow and within what latency limit. It should be understood that in a network supporting PQoS, any PQoS flow is guaranteed to be sent within a relatively short predetermined amount of time (typically some milliseconds), regardless of the priority assigned to the PQoS flow, once the PQoS is admitted into the network (e.g., by the NC and other nodes involved in this flow). The NC determines how much bandwidth is required by evaluating the set of parameters provided in the TSPEC of the flow. As noted above, the TSPEC typically includes the maximum packet size, peak rate, etc. Typically a network supporting PQoS uses up to a given percentage of total network capacity for supporting PQoS flows. For example, an NC can reserve 80% of the transmission slots within each MAP cycle for assignment to PQoS flows. By determining how much bandwidth is required for a new PQoS flow and how much has been reserved for existing PQoS flows, the NC can determine if it has enough capacity to admit the new PQoS flow. Once a new PQoS flow is admitted, the NC is committed to ensuring that there is sufficient bandwidth available for the new PQoS flow.

One technique for managing QoS in networking applications is provided by Universal Plug and Play (UPnP), which sets forth a series of networking protocols promulgated by the UPnP Forum. UPnP theoretically permits devices to connect with one another in home networks for data sharing and other communications. UPnP follows published UPnP device control protocols (DCP) built on open communication standards. When connected to a network, the UPnP device automatically announces its network address and supported device and service types, so that other devices can recognize and interact with the device.

FIG. 2 is a diagram illustrating an overview of the UPnP protocol that supports QoS functions for use with audio and video communications. QoS for UPnP uses sink device and source device service functions. In the illustrated system, a control point application 125 discovers all the devices and contents on the network, and has the knowledge of the source device, sink device and content to be streamed, along with the content's TSPEC. A control point application 125 requests a QoS Manager 127 in the network to set up a QoS flow for a traffic stream. Generally, a QoS Manager is provided to manage QoS topology updates, manage QoS preemption and invoke QoS flow transactions. The control point application 125 may include an indication of the "QoS Policy Holder" 128 to be used when requesting the services of the QoS Manager. Because the QoS Manager and QoS Policy Holder are logic entities, they may be located anywhere on a network.

The QoS Manager 127 requests an appropriate policy for the traffic stream from the QoS Policy Holder 128. Based on this policy, the QoS Manager 127 configures one or more "QoS Devices" 130 to handle the traffic stream. The QoS Policy Holder 128 provides the traffic policy for the network on which the QoS Policy Holder 128 resides. The traffic policy can be used to set the relative importance of a traffic stream.

For Prioritized QoS, the QoS Policy Holder 128 defines the Priority of each stream using a "TrafficImportanceNumber"; and tags the packets with this priority. For PQoS the QoS Policy Holder 128 defines the UserImportanceNumber to be used when Preemption may be needed in order to admit a new PQoS flow while the parameterized bandwidth is saturated.

For Prioritized QoS, the QoS Manager 127 informs each involved node that a Prioritized QoS stream is attempting to be set up, and informs the source node about the priority of the traffic for tagging. For PQoS, the QoS Manager 127 manages network topology, manages the admission process of a PQoS flow, and manages preemption. Each QoS Device 130, in turn, reports path information, states, and events to the QoS Manager 127 using its QoS Device Service. As illustrated, each QoS Device 130 comprises a QoS Device Service and a MoCA layer, which together form one node.

For the admission process, each QoS Device 130 (i.e., node) invoked by the QoS Manager 127 checks to see whether it has enough network bandwidth for the PQoS flow, whether it has enough buffer space for the PQoS flow, and whether it has enough resources to support the TSpec of the PQoS flow. Traditionally, in order to use UPnP QoS to manage (i.e., set up, update, delete) a PQoS flow on a network, the nodes participating in the PQoS flow have had to have a UPnP QoS Device Service, which usually requires networking messaging higher than layer 2 to communicate with the QoS Manager. For the purposes of this disclosure, layer 2 refers to the Data Link Layer of the seven-layer OSI model of computer networking and high layer or higher-layer messaging refers to messaging that is done at protocol layers greater than layer 2.

FIG. 3 illustrates a configuration using UPnP QoS Device Services to implement a PQoS flow 321 from a source Node A 312 on a network segment 303 to a destination Node C 318 on a network segment 306, designated as PQoS flow "AC." As illustrated, Nodes A 312, QoS Manager 315, and Node C 318 all comprise a physical layer (PHY) 310 and a Data Link Layer 311 (i.e., layer 2). The two network segments 303, 306 are connected to a bridge node 309, which connects the two networks together using its Bridging Logic and its two network ports (the Port 324 connected to network segment 303, and the Port 327 connected to the network segment 306). Like the other nodes 312, 318, both bridge ports 224, 327 comprise a PHY layer 310 and a Data Link Layer 311.

As shown, Node A 312, the QoS Manager 315, Node C 318 and the bridge node 309 all support UPnP QoS Device Services (in this case, UPnP QoS Version 3.0). The QoS Manager 315 resides on the network segment 306 and functions as a UPnP QoS Manager. As previously noted, a QoS Manager is a logic entity and may be located anywhere on a network (in this case, the QoS Manager 127 resides on the network segment 306 within Node QM 315). The QoS Manager 127 is responsible for invoking QoS flow transactions. As such, in order to set up the PQoS flow AC 321 from Node A 312 to Node C 318, Node QM 315 invokes a PQoS flow setup action on Node A 312, bridge node 309, and Node C 318 via UPnP QoS Device Services. The UPnP QoS Device Service of each node involved (in this case, Nodes A 312 and Node C 318, and bridge node 309) determines if it has enough network bandwidth and enough buffer space for the PQoS flow, and whether it has enough resources to meet the requirements of the TSpec. After receiving all such information, via higher-layer messaging (i.e., network messaging above layer 2), from the UPnP QoS Device Service of each node (312, 318, 309), the UPnP QoS Device Service of each node (312, 318, 309) responds to the UPnP QoS Manager, which then determines whether the PQoS flow setup has succeeded or not.

BRIEF SUMMARY

Various embodiments of the systems, methods, and apparatuses are disclosed for implementing a Parameterized Quality of Service (PQoS) flow between two or more nodes when some nodes involved in the flow lack support for high layer messaging. As noted before, for the purposes of this disclosure, high layer messaging refers to messaging that is done at protocol layers greater than layer 2, wherein layer 2 refers to the Data Link Layer of the seven-layer OSI model of computer networking Specifically, some embodiments set up a PQoS flow when the flow involves at least one node that lacks network layers higher than a Data Link Layer (i.e., layer 2). For example, some embodiments create a UPnP QoS flow between a source node and a destination node (sometimes referred to as "sink node") even when at least one of the nodes participating in the flow (e.g., the source, destination or a bridge node through which the QoS flow passes) lacks support for UPnP QoS Device Services (i.e., messaging at a layer higher than network layer 2). Some such embodiments facilitate creating such a flow using layer 2 messaging mechanisms to set up PQoS flows between the nodes. In some embodiments, the nodes translate UPnP QoS flow transactions into layer 2 messages using a layer 2 messaging mechanism (e.g., MoCA Layer 2 Management Entity (L2ME)).

In one embodiment, a QoS management apparatus is provided that has a processor, and a computer executable program code embodied on a non-transitory computer readable storage medium that performs the functions of a QoS Manager. More particularly, the program, when executed by the processor, causes the QoS management apparatus to perform operations to create a PQoS flow between a source node and a destination node. In some embodiments, the source node and the destination node are on different network segments that are connected together by one or more nodes, such as bridge nodes.

According to some embodiments of the invention, the nodes provided comprise: a processor; and a memory coupled to the processor on which is stored computer executable code, when executed by the processor, causes the node to perform various operations in accordance with the invention. According to other embodiments of the invention, an integrated circuit chips for network communication are provided that perform functions and operations in accordance with the invention.

In some embodiments, a node has a high layer QoS Management Service (i.e., the node is a QoS management apparatus configured to provide QoS management services using high layer network messaging). Such a node (also referred to as a QM node) may be configured to perform the operations of:

1) receiving, via high-layer messaging, a request to create a parameterized quality-of-service (PQoS) flow between a source node and a destination node;
2) determining that the PQoS flow involves a first node that does not have a high layer QoS Device Service (i.e., cannot receive and act upon commands sent by the QoS Management Service);
3) determining that the PQoS flow involves a second node adjacent the first node that has a high layer QoS Device Service (i.e., can receive and act upon commands sent by the QoS Management Service);
4) requesting, via high-layer messaging, that the second node create the PQoS flow between the source node and the destination node;
5) receiving, via high-layer messaging, a response from the second node acknowledging whether a segment of the PQoS flow involving the first node and the second node was successfully created using layer-2 messaging; and
6) in response to receipt of the response, acknowledging the status of the PQoS flow (i.e., all segments successfully created or, alternatively, that some segments have failed).

Scenarios where the above embodiment may be used include: (1) where a PQoS flow is being created between a source node and a destination through a bridge node that lacks support for high layer messaging; (2) where a PQoS flow is being created between a source node that supports high layer messaging and a destination node that lacks support for high layer messaging through a bridge node that supports high layer messaging; (3) where a PQoS flow is being created between a source node that lacks support for high layer messaging and a destination node that supports high layer messaging through a bridge node that supports high layer messaging; and (4) where a PQoS flow is being created between a source node that lacks support for high layer messaging and a destination node that lacks support for high layer messaging through a bridge node that supports high layer messaging. For example, in scenario (1), the first node is a bridge node, and the second node is either the source node or the destination node, the segment is a first segment of the PQoS flow from the source node to the bridge node where the second node is the source node, and the segment is a second segment of the PQoS flow from the bridge node to the destination node where the second node is the destination node. In another example, for scenarios (2), the first node is a destination node, the second node is a bridge node, and the segment is a second segment of the PQoS flow from the bridge node to the destination node. In another example, for scenario (3), the first node is a source node, the second node is a bridge node, and the segment is a first segment of the PQoS flow from the source node to the bridge node. In yet another example, because in scenario (4) only the bridge node supports high layer messaging, the second node is a bridge node, and each of the source node and the destination are the first nodes, with the bridge node create two segments of the PQoS flow: a first segment of the PQoS flow from the source node to the bridge node; and a second segment of the PQoS flow from the bridge node to the destination node.

Additional scenarios where the above embodiment may be used include: (5) where a PQoS flow is being created between a source node that supports high layer messaging and a destination node that lacks support for high layer messaging through a bridge node that lacks support for high layer messaging; and (6) where a PQoS flow is being created between a source node that lacks support for high layer messaging and a destination node that supports high layer messaging through a bridge node that lacks support for high layer messaging. For example, in scenario (5), the first node is a bridge node, the second node is a source node, the segment is a first segment of the PQoS flow from the source node to the bridge node, and the source node is configured to determine that the PQoS flow passes through the bridge node, to determine that the bridge node and the destination node do not have a high layer QoS Device Service, to set up the first segment of the PQoS flow from the source node to the bridge node using layer-2 messaging, and to request, via layer-2 messaging, that the bridge node set up a second segment of the PQoS flow from the bridge node to the destination node using layer-2 messaging. In another example, for scenario (6), the first node is a bridge node, the second node is a destination node, the segment is a second segment of the PQoS flow from the bridge node to the source node, and the destination node is configured to determine that the PQoS flow passes through the bridge node, to determine that the source node and the bridge node do not have a high layer QoS Device Service, to set up the second segment of the PQoS flow from the bridge node to the destination node using layer-2 messaging, and to request, via layer-2 messaging, that the bridge node set up a first segment of the PQoS flow from the source node to the bridge node using layer-2 messaging.

In other embodiments, the QoS management apparatus is a node configured to utilize intermediary nodes as proxy nodes, and to perform the operations of:

1) receiving, via high-layer messaging, a request to create a parameterized quality-of-service (PQoS) flow between a source node and a destination node;
2) determining that the PQoS flow involves a first node that does not have a high layer QoS Device Service;
3) identifying a second node adjacent the first node that has a high layer QoS Device Service;
4) requesting, via high-layer messaging, that the second node create the PQoS flow between the source node and the destination node;
5) receiving, via high-layer messaging, a response from the second node acknowledging whether a segment of the PQoS flow involving the first node was successfully created using layer-2 messaging; and
6) in response to receipt of the response, acknowledging the status of the PQoS flow (i.e., whether all segments were successfully created or, alternatively, some segments failed).

Scenarios where the above embodiment may be used include: (7) where a PQoS flow is being created between a source node that lacks support for high layer messaging and a destination node that supports high layer messaging through a bridge node that lacks support for high layer messaging using an intermediary node that supports high layer messaging as a proxy node for the source node; and (8) where a PQoS flow is being created between a source node that supports high layer messaging and a destination node that lacks supports for high layer messaging through a bridge node that lacks support for high layer messaging using an intermediary node that supports high layer messaging as a proxy node for the destination node. For example, in scenario (7), the first node is a source node, the second node is a proxy node, and the segment is a first segment of the PQoS flow from the source node to a bridge node. In another example, for scenario (8), the first node is a destination node, the second node is a proxy node, and the segment is a second segment of the PQoS flow from a bridge node to the destination node.

In some embodiments, source, destination and bridge nodes are provided that work in conjunction with a node that operates as a QoS management apparatus in accordance with the invention. The operations performed by such (source, destination and bridge) nodes may comprise:

1) receiving, via high-layer messaging, a request from a requestor node to create a parameterized quality-of-service (PQoS) flow between a source node and a destination node;
2) determining that the PQoS flow involves the node;
3) determining that the PQoS flow involves a second node that does not have a high layer QoS Device Service and that is adjacent to the node;
4) using layer-2 messaging to attempt to create a segment of the PQoS between the node and the second node; and
5) transmitting, via high-layer messaging, a response to the requestor node (e.g., QoS management apparatus, also referred to as a QM node) acknowledging whether the segment of the PQoS flow was successfully created.

For example, where the node is a source node and the second node is a bridge node, the segment is a first segment of the PQoS flow from the source node to the bridge node, and the stored computer executable code further causes the node to:

1) determine that the destination node does not have a high layer QoS Device Service;
2) request, via layer-2 messaging, that the bridge node set up a second segment of the PQoS flow from the bridge node to the destination node using layer-2 messaging;

3) receive, via layer-2 messaging, a response from the bridge node acknowledging whether the second segment of the PQoS flow was successfully created using layer-2 messaging; and
4) in response to receipt of the response, transmit, via high-layer messaging, an aggregated response to the requestor node acknowledging whether the first segment of the PQoS flow and the second segment of the PQoS flow were successfully created or alternatively, whether one or both of the segments failed.

In another example, where wherein the node is a destination node and the second node is a bridge node, the segment is a first segment of the PQoS flow from the source node to the bridge node, and the stored computer executable code further causes the node to:
1) determine that the source node does not have a high layer QoS Device Service;
2) request, via layer-2 messaging, that the bridge node set up a first segment of the PQoS flow from the source node to the bridge node using layer-2 messaging;
3) receive, via layer-2 messaging, a response from the bridge node acknowledging whether the first segment of the PQoS flow was successfully created using layer-2 messaging; and
4) in response to receipt of the response, transmit, via high-layer messaging, an aggregated response to the requestor node acknowledging whether the first segment of the PQoS flow and the second segment of the PQoS flow were successfully created or alternatively, whether one or both segments have failed.

In yet other examples, where the node is a bridge node, the second node may be a destination node or a source node.

In further embodiments, intermediary nodes are provided that function as proxy nodes in conjunction with a node that operates as a QoS management apparatus in accordance with the invention. The operations performed by such proxy nodes may comprise:
1) receiving, via high-layer messaging, a request from a requestor node to create a parameterized quality-of-service (PQoS) flow between a source node and a destination node;
2) determining that the PQoS flow involves a first node that does not have a high layer QoS Device Service and that is adjacent to the node;
3) determining that the PQoS flow involves a second node that is adjacent to the node;
4) using layer-2 messaging to attempt to create a segment of the PQoS between the first and the second node; and
5) transmitting, via high-layer messaging, a response to the requestor node (e.g., QoS management apparatus, also referred to as a QM node) acknowledging whether the segment of the PQoS flow was successfully created.

Example scenarios where such an embodiments may be used include: where the first node is a bridge node and the second node is a source node (i.e., the source node support high layer messaging, the bridge node lacks support for high layer messaging, and the source node serves as a proxy node for the bridge node); where the first node is a bridge node and the second node is a destination node (i.e., the destination node support high layer messaging, the bridge node lacks support for high layer messaging, and the destination node serves as a proxy node for the bridge node); where the first node is a source node and the second node is a bridge node (i.e., the bridge node support high layer messaging, the source node lacks support for high layer messaging, and the bridge node serves as a proxy node for the source node); and where the first node is a destination node and the second node is a bridge node (i.e., the bridge node support high layer messaging, the destination node lacks support for high layer messaging, and the bridge node serves as a proxy node for the destination node). In some embodiments, the intermediary node is not involved in the PQoS flow but is on the same network segment as the node for which it is serving as proxy.

It should be noted that depending on the embodiment, when a QM node requests that an intermediary node create a flow between the bridge node and a end node (i.e., source node or destination node) via layer 2 of their respective protocol stacks, the intermediary node may instruct the layer 2 of the end node's protocol stack to create a PQoS flow between itself and the bridge node. For example, the intermediary may instruct the end node to create a PQoS flow with the bridge node via layer-2 management messaging (e.g., MoCA L2ME). By doing so, the intermediary node effectively translates high layer messaging requests (i.e., QoS requests via, for example, UPnP) into layer-2 messaging.

In additional embodiments, bridge nodes are provided that lack support for high layer messaging but working in conjunction with a node that operates as a QoS management apparatus in accordance with the invention by performing the operations of:
1) receive, via layer-2 messaging, a request from a first node (i.e., a requestor node) to create a parameterized quality-of-service (PQoS) flow between a source node and a destination node, wherein the first node is adjacent the bridge node on a first network segment;
2) determine that the PQoS flow involves a second node that does not have a high layer QoS Device Service, wherein the second node is adjacent the bridge node on a second network segment;
3) use layer-2 messaging to attempt to create a segment of the PQoS between the bridge node and the second node; and
4) transmit, via layer-2 messaging, a response to the first node acknowledging whether the segment of the PQoS flow was successfully created.

Such bridge nodes may be used, for example, where a PQoS flow is being created between a source node that supports high layer messaging and a destination node that lacks support for high layer messaging through a bridge node that lacks support for high layer messaging (same as scenario (5) described above); or where a PQoS flow is being created between a source node that lacks support for high layer messaging and a destination node that supports high layer messaging through a bridge node that lacks support for high layer messaging (same as scenario (6) as described above). Accordingly, for scenario (5), the first node is a source node and the second node is a destination node, while for scenario (6), the first node is a destination node and the second node is a source node. It should be noted that this "propagation" of the layer 2 commands to create additional segments of the flow could be repeated through several such segments in which the nodes of the segment are both do not have a high layer QoS Device Service.

In various embodiments, the acknowledgment operation involves the QM node informing one or more of the involved nodes of the status of the setup of the PQoS flow (i.e., was the setup successful or not). Further, some embodiments of the disclosed method and apparatus are implemented such that either the source node, the destination node, the intermediary node, or the QM node is operating on a MoCA network.

Additionally, in some embodiments, the bridge node comprises of two or more bridge nodes spanning across more then two network segments. In such embodiment, the bridge node may operate as a source node for the purposes of creating segments of a PQoS flow through subsequent bridge nodes, thereby allowing a PQoS flow to be setup through a chain of bridge nodes over more than two network segments.

In various embodiments, where a source node, destination node, bridge node, or intermediary (i.e., proxy) node have a high layer QoS Device Service, and a QM node with a high layer QoS Management Service, the high layer QoS Management Service utilizes high layer network messaging to perform its services. For example, the high layer QoS Management Service may be a UPnP QoS service. Having a QoS Device Service makes a node a UPnP QoS device. In other embodiments, where a source node, destination node, or bridge node do not have a high layer QoS Device Service, each such a node would lack UPnP QoS services (i.e., these nodes would be a non-UPnP QoS devices and would not have a QoS Device Service capability).

It should be appreciated that though several of the embodiments described herein disclose a QoS Management apparatus requesting a (source, destination, bridge, or prodxy) node to create a PQoS flow from a source node to a destination node and the node, in response, creating only a segment of such PQoS flow, in some embodiments, the QoS Management apparatus may be configured to explicitly request the node to create the segment of the PQoS flow.

It should also be appreciated that the disclosed embodiments can also be implemented in ways other than an apparatus, such as a system, a method, or a non-transitory computer storage medium or a computer network wherein program instructions are sent over optical or electronic communication lines.

Other features and aspects of the disclosed method and apparatus will become apparent from the following detailed description, taken in conjunction with the accompanying drawings, which illustrate, by way of example, the features in accordance with embodiments of the disclosed method and apparatus. For example, though example embodiments presented herein are described in relation to network layer 2 and UPnP, one of ordinary skill in the art will understand that the features and functionality of the disclosed method and apparatus can be implemented using other network layers and messaging protocols. The summary is not intended to limit the scope of the invention, which is defined solely by the claims attached hereto.

BRIEF DESCRIPTION OF THE DRAWINGS

The disclosed method and apparatus is described in detail with reference to the following Figures. The drawings are provided for purposes of illustration only. Accordingly, these drawings shall not be considered limiting of the breadth, scope, or applicability of the claimed invention. Note that for clarity and ease of illustration, these drawings are not necessarily made to scale.

DETAILED DESCRIPTION

The disclosed method and apparatus is directed to systems, methods, and apparatuses for implementing a Parameterized Quality of Service (PQoS) flow between two or more nodes wherein at least one node involved in the flow lacks support for high layer messaging (e.g., does not have a high layer QoS Device Service). For the purposes of this disclosure, high layer messaging is messaging that is done above the Data Link Layer (i.e., layer 2) of the seven-layer OSI model of computer networking. In one network implementing UPnP QoS architecture, the embodiment of the disclosed method and apparatus would allow a UPnP QoS source node and a UPnP QoS destination node to create a PQoS flow through a non-UPnP QoS bridge node. Some embodiments of the disclosed method and apparatus facilitate such PQoS flows by using layer 2 messaging mechanisms, such as MoCA Layer 2 Management Entity (L2ME) to create the flow.

Figure 4:
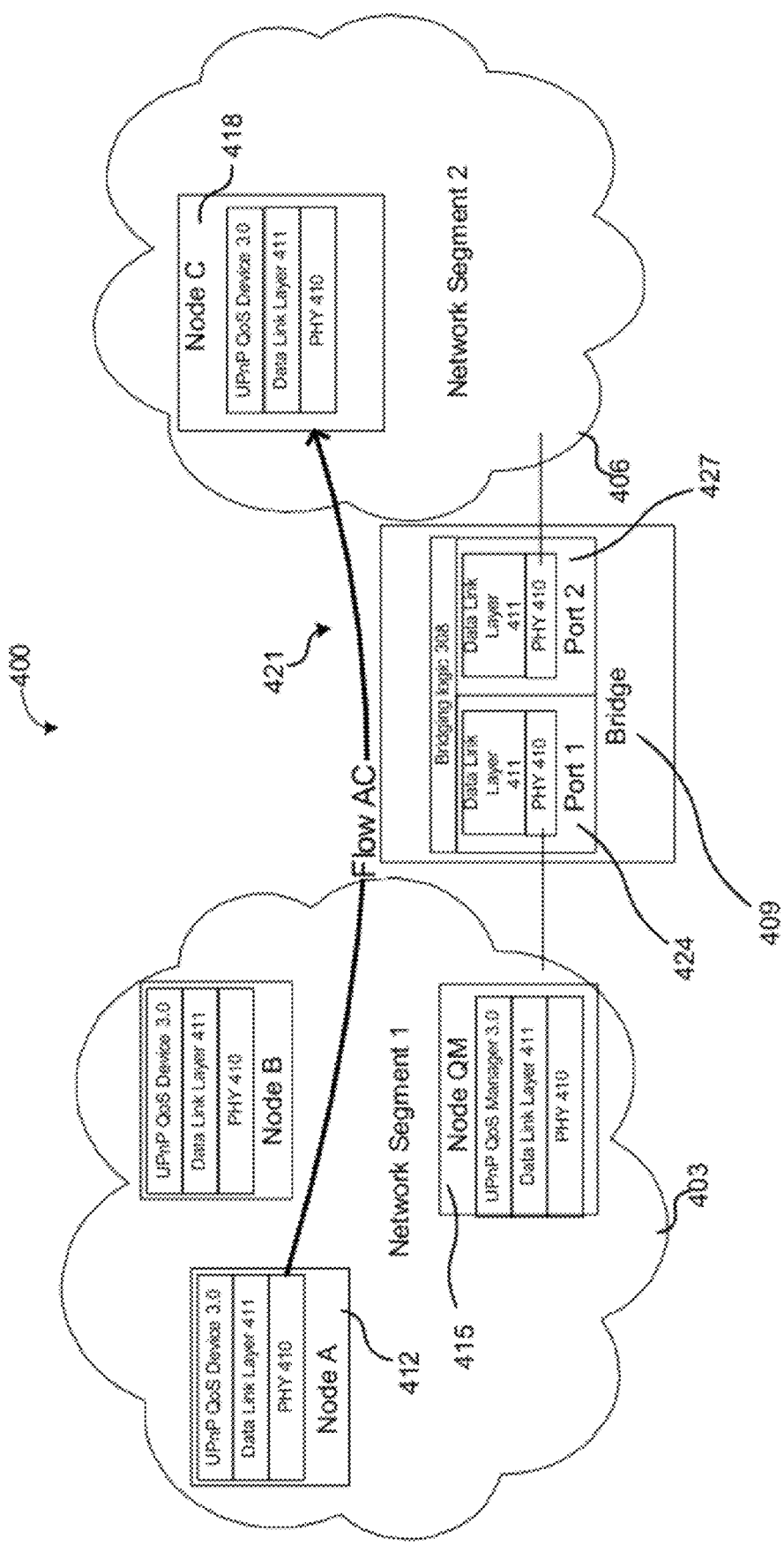
FIG. 4 is a diagram illustrating an example network on which a PQoS flow is created in accordance with one embodiment of the disclosed method and apparatus.

FIG. 4 illustrates an example network on which a PQoS flow is created in accordance with one embodiment of the disclosed method and apparatus. FIG. 4 illustrates a PQoS flow AC 421 from a source Node A 412 on a first network segment 403 to a destination Node C 418 on a second network segment 406. The flow 421 passes through a bridge node 409, which connects the two networks together using its bridging logic and its two network ports (a first Port 424 connected to the first network segment 403, and a second Port 427 connected to the second network segment 406). A QoS management apparatus, such as a QoS Management Node 415 of FIG. 4 having a QoS Management Service, resides on the first network segment 403 and, in one embodiment, includes a UPnP QoS Manager 416. In one embodiment, the QoS management apparatus comprises a processor, and a computer executable program code stored in a memory (i.e., embodied on a non-transitory computer readable storage medium) that performs the functions of a QoS Manager. In another embodiment, the functions of the QoS management apparatus as described herein are implemented into an integrated circuit chip, such as an ASIC, PLA, PAL, CPLD, or FPGA. In additional embodiment, the functions of the QoS management apparatus may be implemented using one or more hardware or software modules.

The functions of the QoS management apparatus are performed by a logic entity, and may be located anywhere on a network (in this case, in Node QM 415). Accordingly, the QoS management apparatus can be coexistent with another functional apparatus (i.e., share hardware that performs the functions of the QoS Manager with functions of another apparatus). For example, an otherwise conventional node of the network can also perform the functions of the QoS Manager and thus be the QoS management apparatus. It will be understood by those skilled in the art that the QoS Manager need not be a UPnP QoS Manager. Rather, the QoS Manager can be any manager that is capable of creating high layer messaging and that sets up and manages QoS flows.

As illustrated, Node A 412, Node QM 415, Node C 418, and both bridge ports 424, 427 have a PHY 410 layer and a Data Link Layer 411. While the bridge node 409 lacks any network layers or messaging protocols higher than the Data Link Layer 411 (layer 2) (i.e., does not have a QoS Device Service), Node A 412, node QM 415, and node C 418 support high layer messaging (i.e., do have a high layer QoS Device Service capable of receiving and implementing commands from a QoS Management Service). In one embodiment, both Nodes A 412 and C 418 have UPnP QoS Device Services, and Node QM 415 functions as a UPnP QoS Manager (i.e., has a QoS Management Service).

Figure 1:
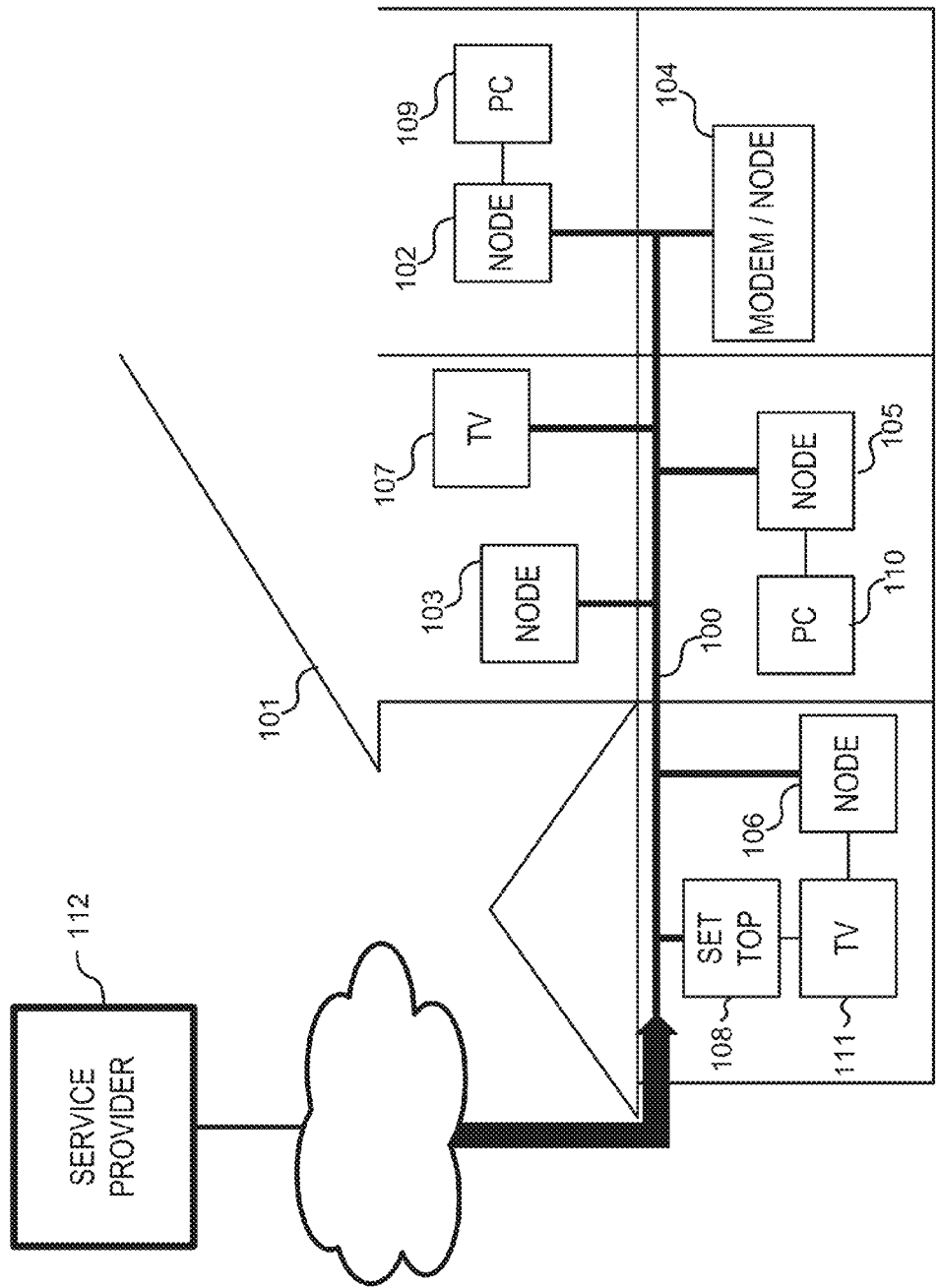
FIG. 1 illustrates an example of one environment in which some embodiments of the disclosed method and apparatus may be implemented.
Figure 2:
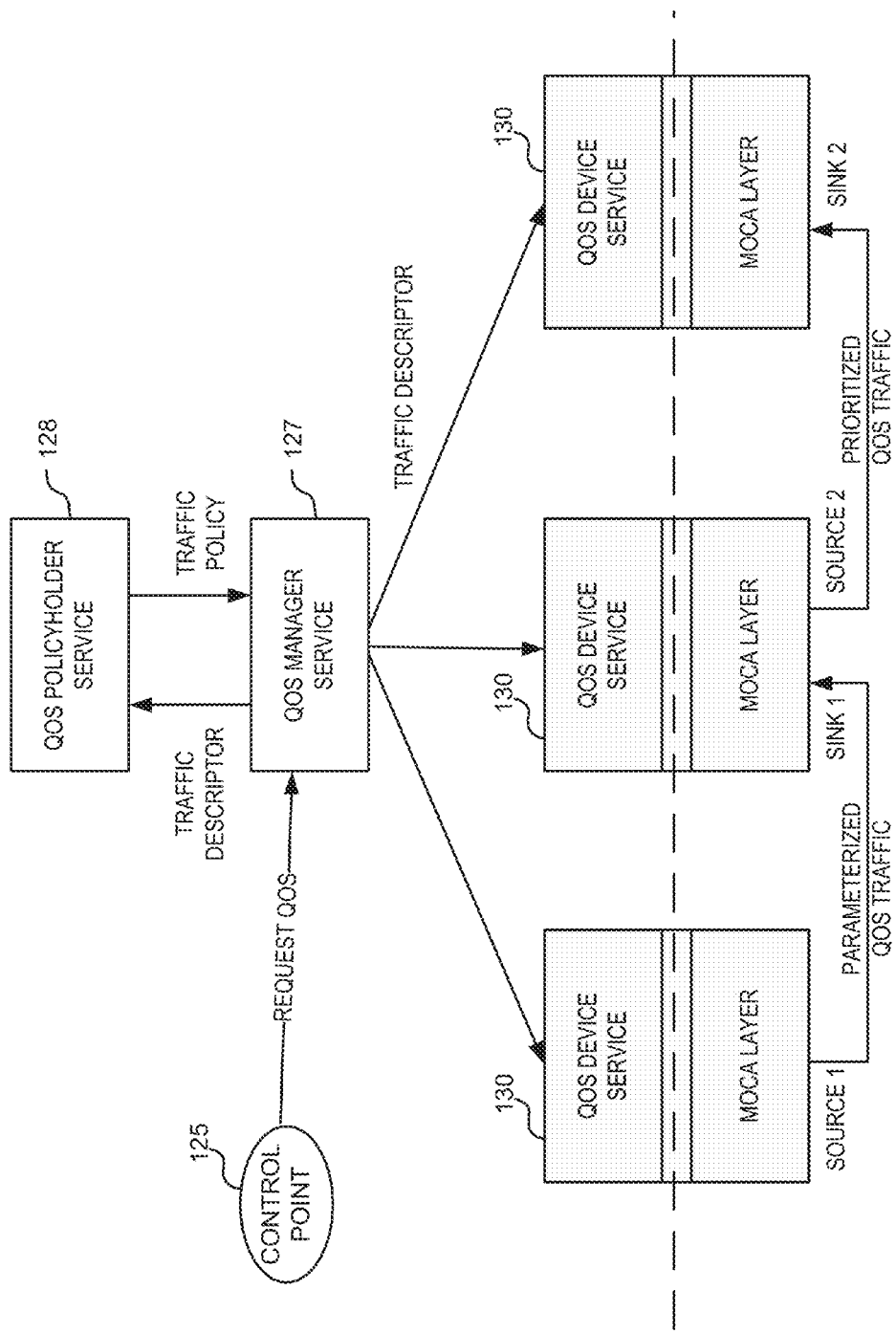
FIG. 2 is a diagram illustrating an example of a system for performing UPnP QoS for a network.
Figure 3:
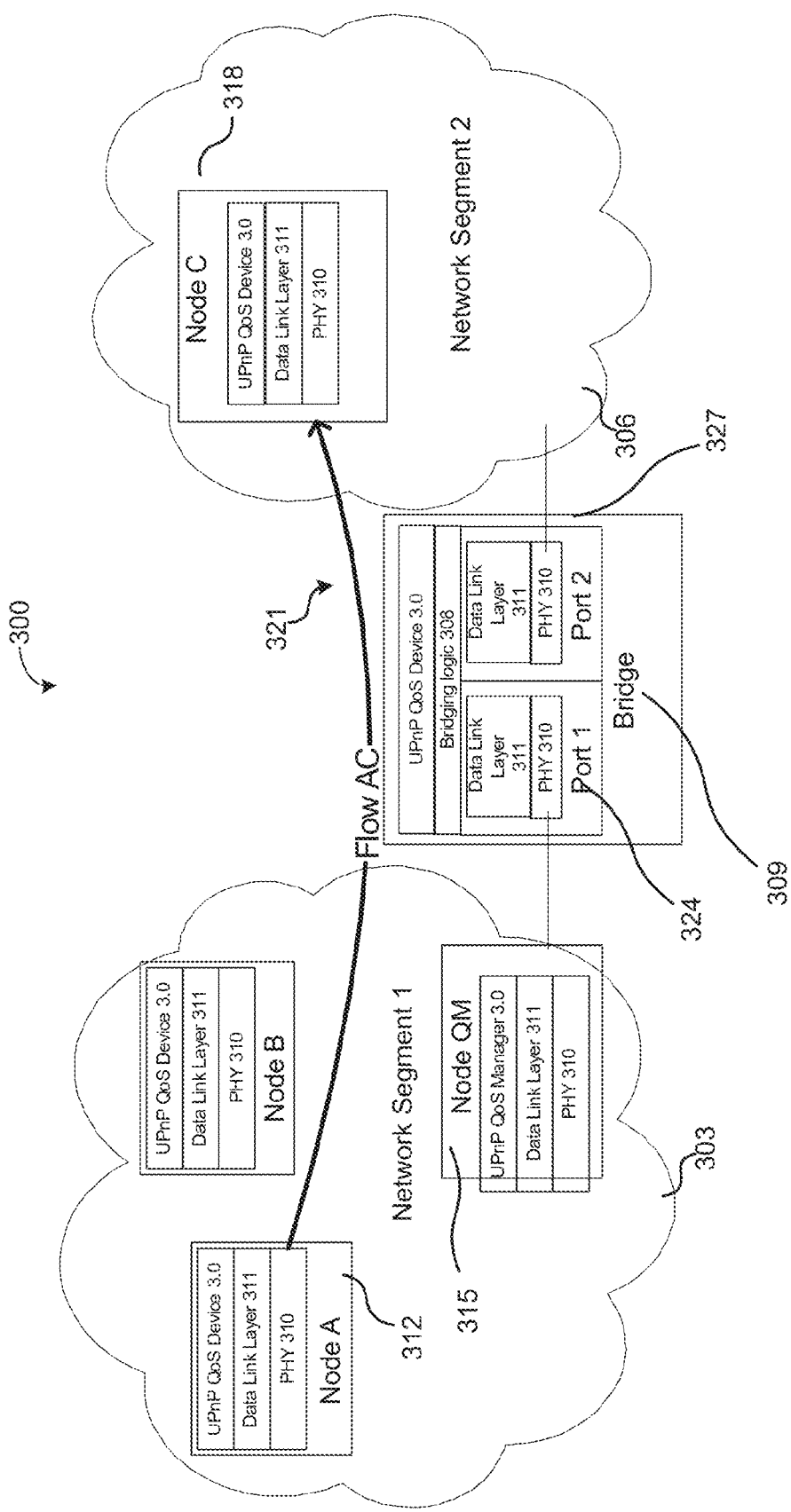
FIG. 3 is a diagram illustrating an example use of UPnP QoS Device Services to implement a PQoS flow between two nodes on different network segments.
Figure 5:
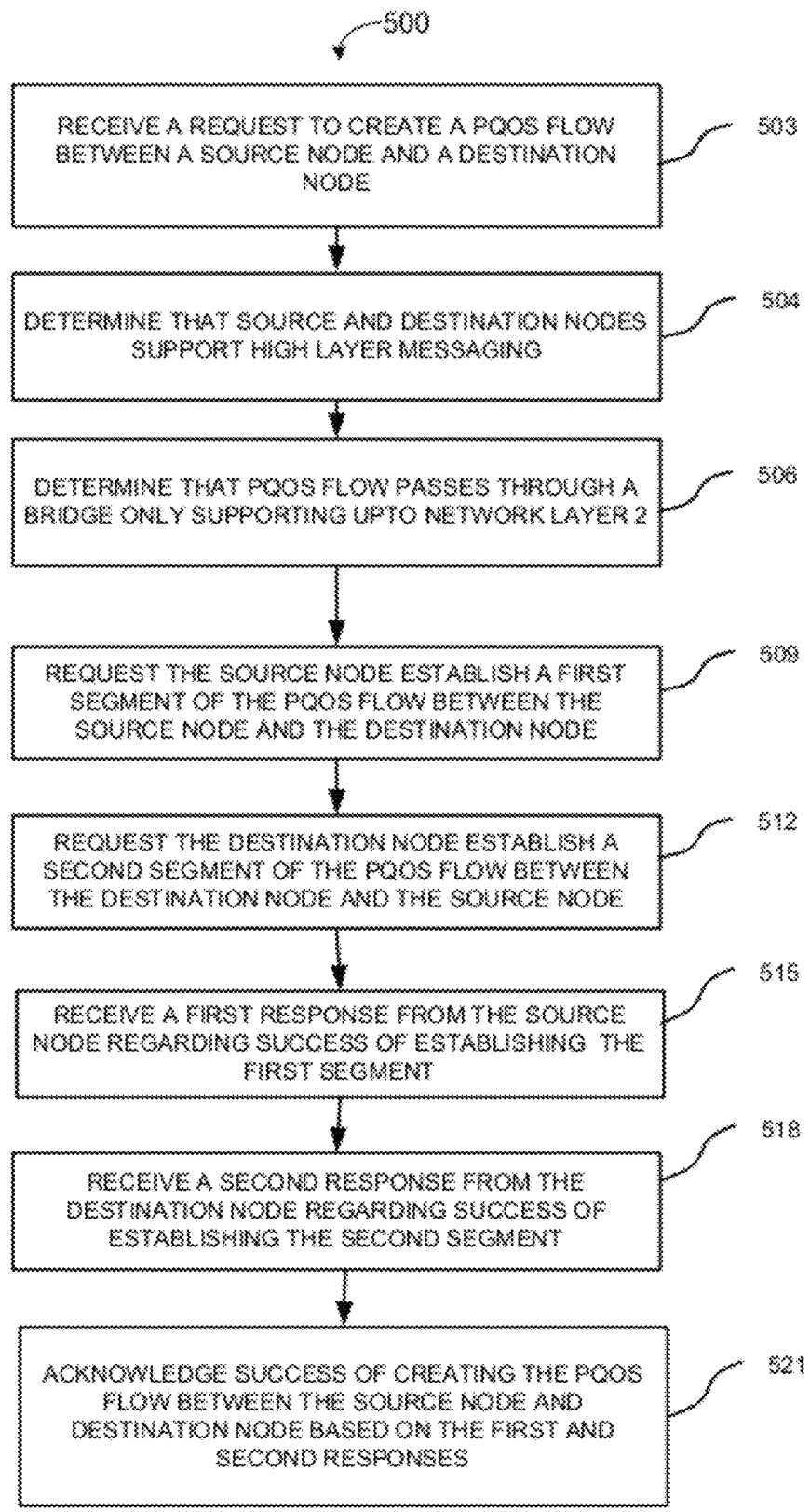
FIG. 5 is a flowchart illustrating an example method for creating a PQoS flow between a source node and a destination through a bridge node that lacks support for high layer messaging (e.g., lacks a high-layer QoS Device Service) in accordance with one embodiment of the disclosed method and apparatus.

FIG. 5 is a flowchart illustrating an example method 500 by which Node QM 415 can create the PQoS flow AC 421 from the source Node A 412 on the first network segment 403 to the destination Node C 418 on the second network segment 406. The Method 500 begins with the QoS Manager (Node QM 415) receiving a request to create a PQoS flow AC 421 between the source Node A 412 and the destination Node C 418 (OPERATION 503). The request is received through a communications interface 1724 (shown in FIG. 17) via high layer messaging from a control point, such as the control point 125 shown in FIG. 2.

Using a map of the network that Node QM 415 has built up (as is well known to those skilled in the art), Node QM 415 determines that the source Node A 412 and the destination Node C 418 support high layer messaging (i.e., have a high layer QoS Device Service) (OPERATION 504). Node QM 415 also determines that the PQoS flow AC 421 passes through bridge node 409 (OPERATION 506) that does not have a high-layer QoS Device Service. In response to determining that the flow must go through the bridge node 409, Node QM 415 (i.e., the requestor node) requests via high layer messaging that the source Node A 412 create a PQoS flow to the destination Node C 418. The source Node A 412 then uses its map of the network to determine that the requested PQoS flow will need to traverse the bridge node 409. Accordingly, the source Node A 412 will use layer 2 messaging (such as provided by MoCA) to create a first segment of the PQoS flow AC 421 between Node A 412 and the bridge node 409 (OPERATION 509). The QM node 415 also requests that the destination Node C 418 create a PQoS flow from the source Node A 412 to the destination Node C 418 (OPERATION 512). In some embodiments, as a result of OPERATION 509, Node A 412 creates a first segment of the PQoS flow from the source Node A 412 to the bridge node 409 over the first network segment 403; and a as result of OPERATION 512, Node C 418 creates a second segment of the PQoS flow from the bridge node 409 to the destination Node C 418 over the second network segment 406.

When Node C 418 attempts to fulfill the request, Node C 418 will determine by referencing its map of the network, that the PQoS flow AC 421 passes through the bridge node 409. As a result, Node C 418 will create the second segment 406 of the PQoS flow AC 421 between the bridge node 409 and Node C 418 via layer 2 messaging (such as provided by MoCA) to the bridge node 409.

It should be noted that in some embodiments, when requests are sent from Node QM 415 to either Node A 412 or Node C 418, the request may be broadcasted to all the nodes on both the first and second network segments 403, 406. In some such embodiments, once the request is received by all the nodes on the network segments, only the nodes implicated by the broadcasted request (in this case Node A 412 and Node C 418) will respond back to Node QM's request.

Continuing with reference to FIG. 5, once the first segment 403 of the PQoS flow AC 421 has been successfully created, Node QM 415 receives a first response acknowledging whether there was success in creating the first segment 403 (OPERATION 515). The first response is sent from the source Node A 412. Similarly, if the second segment 406 of the PQoS flow AC 421 has been successfully created, Node QM 415 receives a second response acknowledging the success in creating the second segment (OPERATION 518). Alternatively, an acknowledgement of the failure is sent. The second response is sent from the destination Node C 418.

In response to the acknowledgment of success conveyed by the first and second responses, Node QM 415 acknowledges the status of the attempt (i.e., success of creating PQoS flow AC 421 (OPERATION 521)). One way Node QM 415 may acknowledge this success is by informing those nodes involved in the PQoS flow AC (i.e., Node A 412 and bridge node 409) of its successful creation. Node QM 415 also acknowledges this success by sending a message to the control point that initially requested the QoS Manager to set up the PQoS flow. Alternatively, a message is sent indicating that there was a failure in the attempt to create one or more segments. If there is such a failure, the attempt to create the PQoS flow may be abandoned by the Node QM 415. Alternatively, the Node QM 415 may wait for an acknowledgement that the failed segment has been successfully created. A time limit may set, beyond which the attempt to create the flow is abandoned. Once the Node QM 415 abandons the attempt to create the flow, a message will be sent to all of the involved nodes to allow each such node to release the resources that have been reserved for the PQoS flow.

According to an alternative embodiment, when Node QM 415 receives a request from a control point (e.g., control point 125 of FIG. 2) to create a PQoS flow AC from Node A 412 to Node C 418, Node QM 415 invokes a QoS setup action on both Node A 412 and Node C 418. Based on the invocation, the source Node A 412 gets the Internet Protocol (IP) source address and the IP destination address from Node QM 415, and the Media Access Control (MAC) address of destination Node C 418. Then, using its Content Addressable Memory (CAM) and Node C's MAC address, Node A 412 automatically learns that the traffic from Node A 412 to Node C 418 passes through the bridge node 409. As a result, Node A's Data Link Layer 411 sets up a PQoS flow (i.e., the PQoS flow over the first network segment 403) from Node A 412 to the bridge node 409. Node A 412 also instructs the bridge node 409 to commit its network resources to the PQoS flow (i.e., first PQoS flow over the first network segment 403) via layer 2 messaging mechanisms. For example, on a MoCA network, Node A's Data Link Layer 411 could facilitate the bridge node 409 committing its Port 424 to the flow created over the first network segment 403 by using MoCA L2ME messages that are well known to those skilled in the art.

Similarly, based on the invocation of the QoS setup action, destination Node C 418 gets the IP source address and the IP destination address from Node QM 415, and the MAC address of source Node A 412. Then, using its CAM and Node A's MAC address, Node C 418 automatically learns that the traffic from Node A 412 to Node C 418 passes through the bridge node 409. As such, like Node A, Node C's Data Link Layer 411 sets up a PQoS flow (i.e., the PQoS flow over the second network segment 406) from the bridge node 409 to Node C 418. Accordingly, the necessary network and node resources are allocated, which may include the bridge node committing its network resources to the flow via layer 2 messaging mechanisms. Again, on a MoCA network, Node C's Data Link Layer 411 could facilitate the bridge node 409 committing its Port 427 to the PQoS flow over the second network segment 406 by using MoCA L2ME messages.

Subsequently, both Node A 412 and Node C 418 will individually inform Node QM 415 whether their respective segment flows, first flow segment for Node A 412 and second flow segment for Node C 418, were successfully set up. If not successful, an error message may be returned to Node QM 415. Once both Node A 412 and Node C 418 acknowledge to Node QM 415 the success of their respective flow setup, the PQoS flow AC 421 has been successfully set up. In some embodiments, Node QM 415 then acknowledges to all the involved nodes and the control point that initially requested the QoS Manager (Node QM 415) to setup the PQoS flow, that the PQoS flow AC 421 setup was successful (i.e., that each segment required for the PQoS flow has been successfully setup). Alternatively, the Node QM 415 will indicate that some segments have failed and wait for further acknowledgement that those failed segments have later been created. In yet another embodiment, the Node QM 415 will abandon the attempt to create the flow. Once the Node QM 415 abandons the attempt to create the flow, a message will be sent to all of the involved nodes to allow each such node to release the resources that have been reserved for the PQoS flow.

Figure 6:
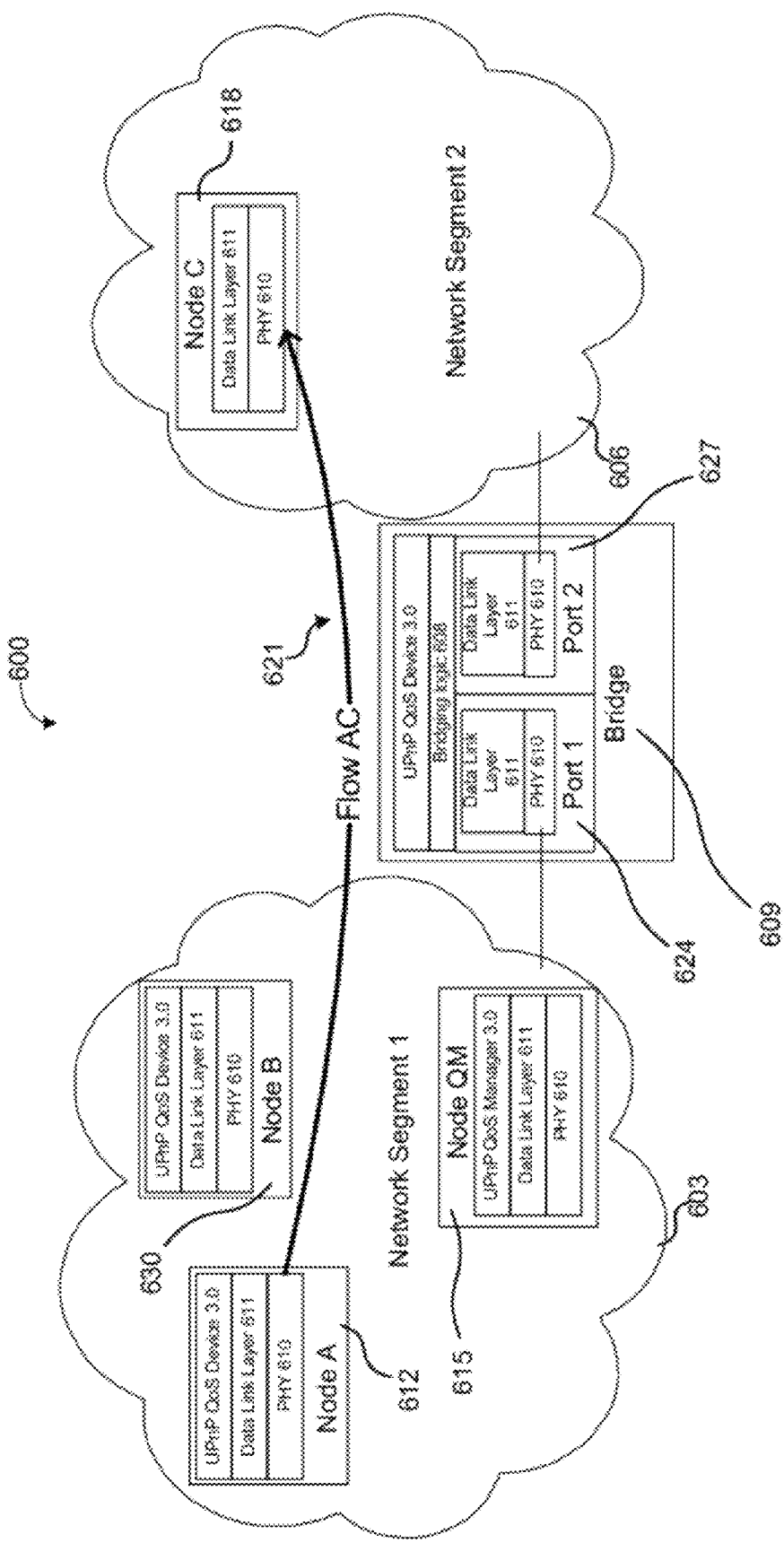
FIG. 6 is a diagram illustrating an example network on which a PQoS flow is created between a source node that supports high layer messaging (e.g., has a high-layer QoS Device Service) and a destination node that lacks support for high layer messaging through a bridge node that supports high layer messaging in accordance with one embodiment of the disclosed method and apparatus.

FIG. 6 is a diagram illustrating an example network on which a PQoS flow is created in accordance with one embodiment of the disclosed method and apparatus. A PQoS flow AC 621 is created from a source Node A 612 on a first network segment 603 to a destination Node C 618 on a second network segment 606. The flow 621 passes through a bridge node 609, which connects the two network segments 603, 606 together using its Bridging Logic 608 and its two network ports (Port 1 624 connected to the first network segment 1 603, and the Port 2 627 connected to the second network segment 2 606). A QoS management apparatus, such as a Node QM 615 resides on the first network segment 603 and functions as a UPnP QoS Manager (i.e., has a high layer QoS Management Service. As previously noted, a QoS Manager is a logic entity, and may be located anywhere on a network (in this case, on the first network segment 603 in Node QM 615) and may be any other form of high layer QoS Management Service. Furthermore, the QoS management apparatus can be coextensive with another functional apparatus.

As illustrated, Node A 612, Node QM 615, Node C 618, and both bridge Ports 624 and 627 each have a PHY layer 610 and a Data Link Layer 611. In the illustrated embodiment, Node C 618 lacks UPnP QoS Device Service. Nodes A 612, bridge node C 609 and Node QM 615, on the other hand, are shown to support high layer messaging (i.e., have a high layer QoS Device Service), with Node A 612 and Node C 618 having UPnP QoS Device Services, and Node QM 615 functioning as a UPnP QoS Manager.

Figure 7:
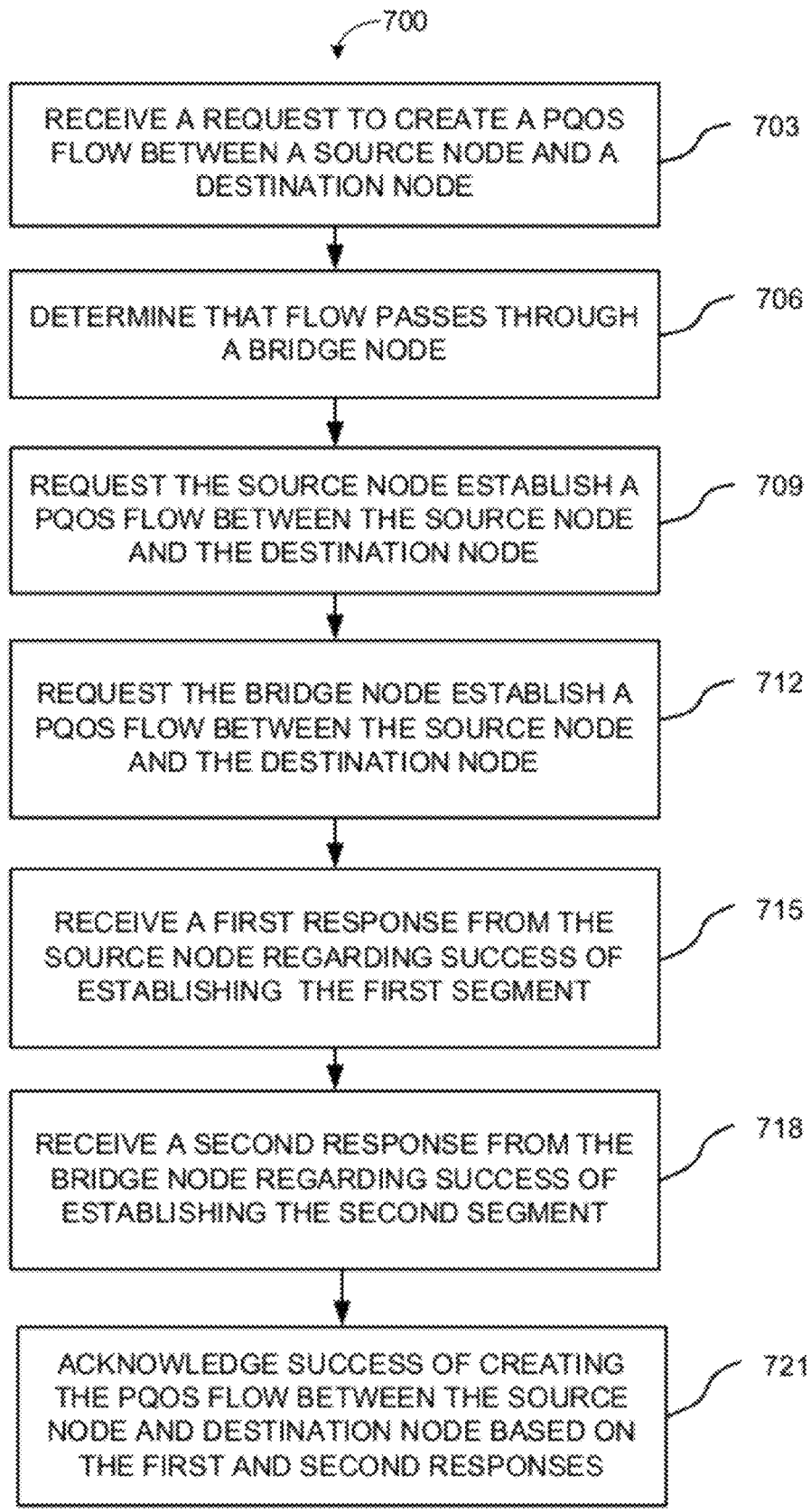
FIG. 7 is a flowchart illustrating an example method for creating a PQoS flow between a source node that supports high layer messaging and a destination node that lacks support for high layer messaging through a bridge node that supports high layer messaging in accordance with one embodiment of the disclosed method and apparatus.

FIG. 7 is a flowchart illustrating an example of one method 700 by which Node QM 615 can create PQoS flow AC 621 from the source Node A 612 on the first network segment 603 to the destination Node C 618 on the second network segment 606. Method 700 begins with the QoS Manager (Node QM 615) receiving a request to create a PQoS flow 621 between a source Node A 612 and a destination Node C 618 (OPERATION 703). Once Node QM 615 determines that the PQoS flow AC 621 passes through the bridge node 609 (OPERATION 706), Node QM 615 requests that the source Node A 612 create a PQoS flow AC 621 from source Node A 612 to the destination Node C 618 (OPERATION 709). Node QM 615 requests that the bridge node 609 create from Node A 612 to the destination Node C 618 (OPERATION 712). In some embodiments, as a result of OPERATION 709, Node A 612 creates a first segment of the PQoS flow from the source Node A 412 to the bridge node 409 over the first network segment 603; and a as result of OPERATION 712, bridge node 609 creates a second segment of the PQoS flow from the bridge node 609 to the destination Node C 618 over the second network segment 606.

In one embodiment, Node QM 615 requests that Node A 612 create the PQoS flow AC 621 from Node A 612 to Node C 618. When Node A 612 attempts to fulfill the request, Node A 612 will automatically learn that the PQoS flow AC 621 passes through bridge node 609 and, as a result, creates the first PQoS flow through the first network segment 603 between Node A 612 and the bridge node 609.

Additionally, it should be noted that in some embodiments, when requests are sent from Node QM 615 (i.e., the requestor node) to Node A 612 and the bridge node 609, such a request may be a broadcast to all the nodes on the first network segment 603. In some such embodiments, once the request is received by all the nodes on a network segment, only the nodes implicated by the broadcasted request (in this case Node A 612) and bridge node 609 will respond back to Node QM's 615 request.

Continuing with reference to FIG. 7, once the first segment of the PQoS flow AC 621 (i.e., a PQoS flow from Node A 612 to the bridge node 609) has been successfully created, Node QM 615 receives a first response acknowledging the success in creating the first segment from the source Node A 612 (OPERATION 715). Similarly, once the second segment of the PQoS flow AC 621 (i.e., the PQoS flow from the bridge node 609 to the destination Node C 618) has been successfully created, Node QM 615 receives a second response acknowledging the success in creating the second segment from the destination bridge node 618 (OPERATION 618). Various embodiments may send the second response by way of Node A 612, which will relay the second response within the first response. Alternatively, an acknowledgement of a failure of the attempt to create the second segment is sent.

In response to the acknowledgment of success conveyed by the first and second responses, Node QM 615 acknowledges the success of creating the PQoS flow AC 621 (OPERATION 721). One way Node QM 615 may acknowledge this success is by informing those nodes involved in the PQoS flow AC (i.e., Node A 612 and bridge node 609) of its successful creation. Node QM 615 also acknowledges this success by sending a message to the control point that initially requested the QoS Manager to set up the PQoS flow. Similarly, if the attempt to create the flow failed, the Node QM 615 acknowledges that as well. In one embodiment, in the case of a failure to create the flow on at least one segment, the Node QM 615 will abandon the attempt to create the flow. Alternatively, the Node QM 615 will wait for a predetermined period to see whether the segment can be successfully created. Once the Node QM 615 abandons the attempt to create the flow, a message will be sent to all of the involved nodes to allow each such node to release the resources that have been reserved for the PQoS flow. In one embodiment, the Node QM can attempt to use another node to create the segment, such as a proxy node. The use of proxy nodes is described in more detail below.

Figure 8:
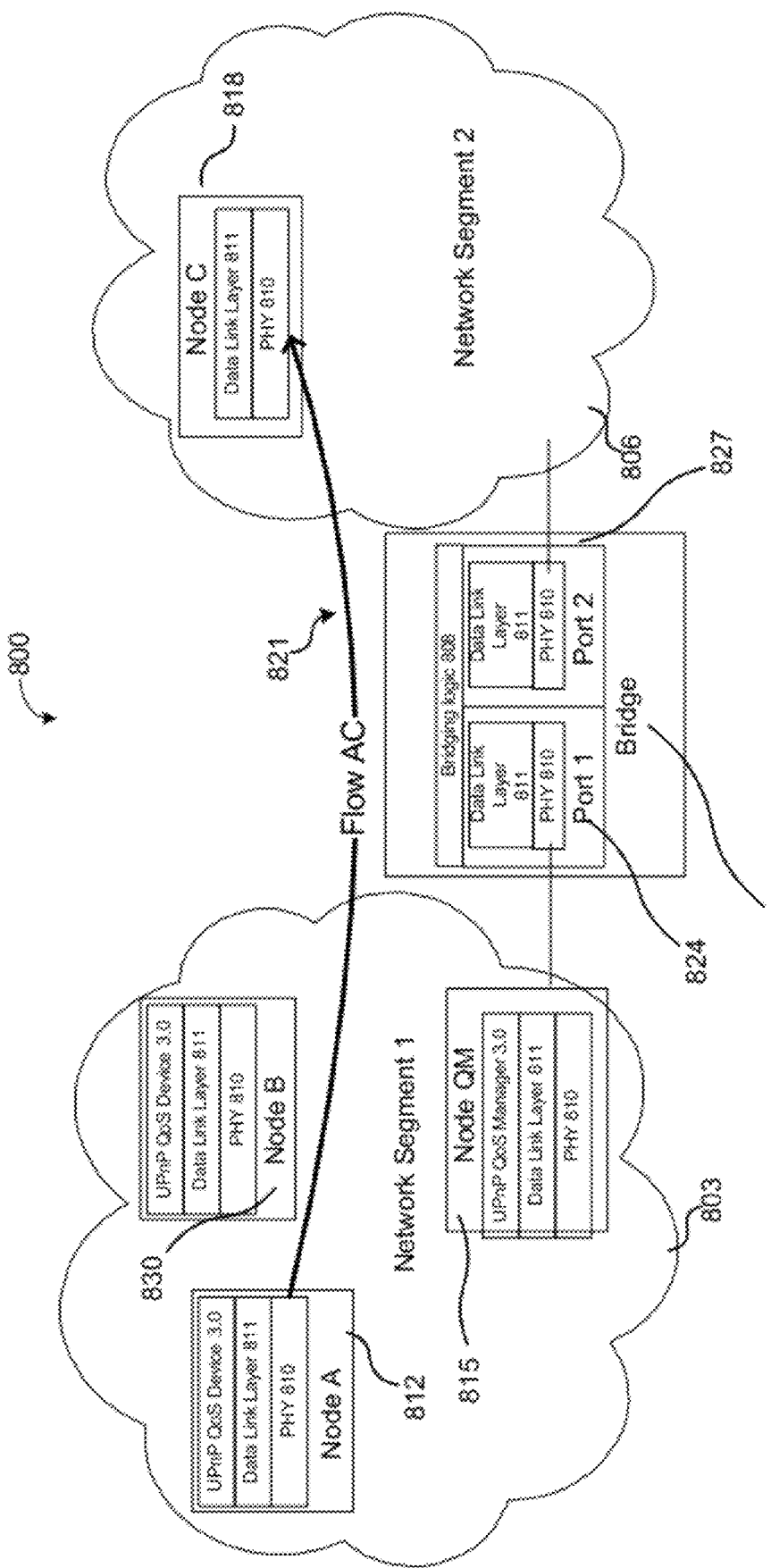
FIG. 8 is a diagram illustrating an example network in which a PQoS flow is created between a source node that supports high layer messaging and a destination node that lacks support for high layer messaging through a bridge node that lacks support for high layer messaging in accordance with one embodiment of the disclosed method and apparatus.

FIG. 8 is a diagram illustrating another example network on which a PQoS flow has been created from a source node that has a UPnP QoS Device Service through a bridge that lacks a UPnP QoS Device Service (i.e., does not have a high layer QoS Device Service) to a destination node that also lacks a UPnP QoS Device Service. Diagram 800 illustrates a PQoS flow AC 621 from a source Node A 812 on a first network segment 803 to a destination Node C 818 on a second network segment 806. The flow 821 passes through a bridge node 809, which connects the two networks together using its Bridging Logic and its two network ports (Port 1 824 connected to the first network segment 803, and the Port 827 connected to the second network segment 806). A QoS management apparatus, such as a Node QM 815 resides on the first network segment 803 and functions as a UPnP QoS Manager. As previously noted, a QoS Manager is a logic entity, and may be located anywhere on a network (in this case, on the first network segment 803 in Node QM 815). Furthermore, the QoS management apparatus can be coextensive with another functional apparatus.

As illustrated, Node A 812, Node QM 815, Node C 818, and both the bridge Ports 824 and 827 include a PHY layer 810 and a Data Link Layer 811. In the illustrated embodiment, both the bridge node 809 and Node C 818 lack UPnP QoS Device Service. The Node A 812 and Node QM 815, on the other hand, are shown to support high layer messaging (i.e., have a high layer QoS Device Service), with Node A 812 having a UPnP QoS Device Service, and Node QM 815 functioning as a UPnP QoS Manager (i.e., (i.e., having a high layer QoS Management Service).

Figure 9:
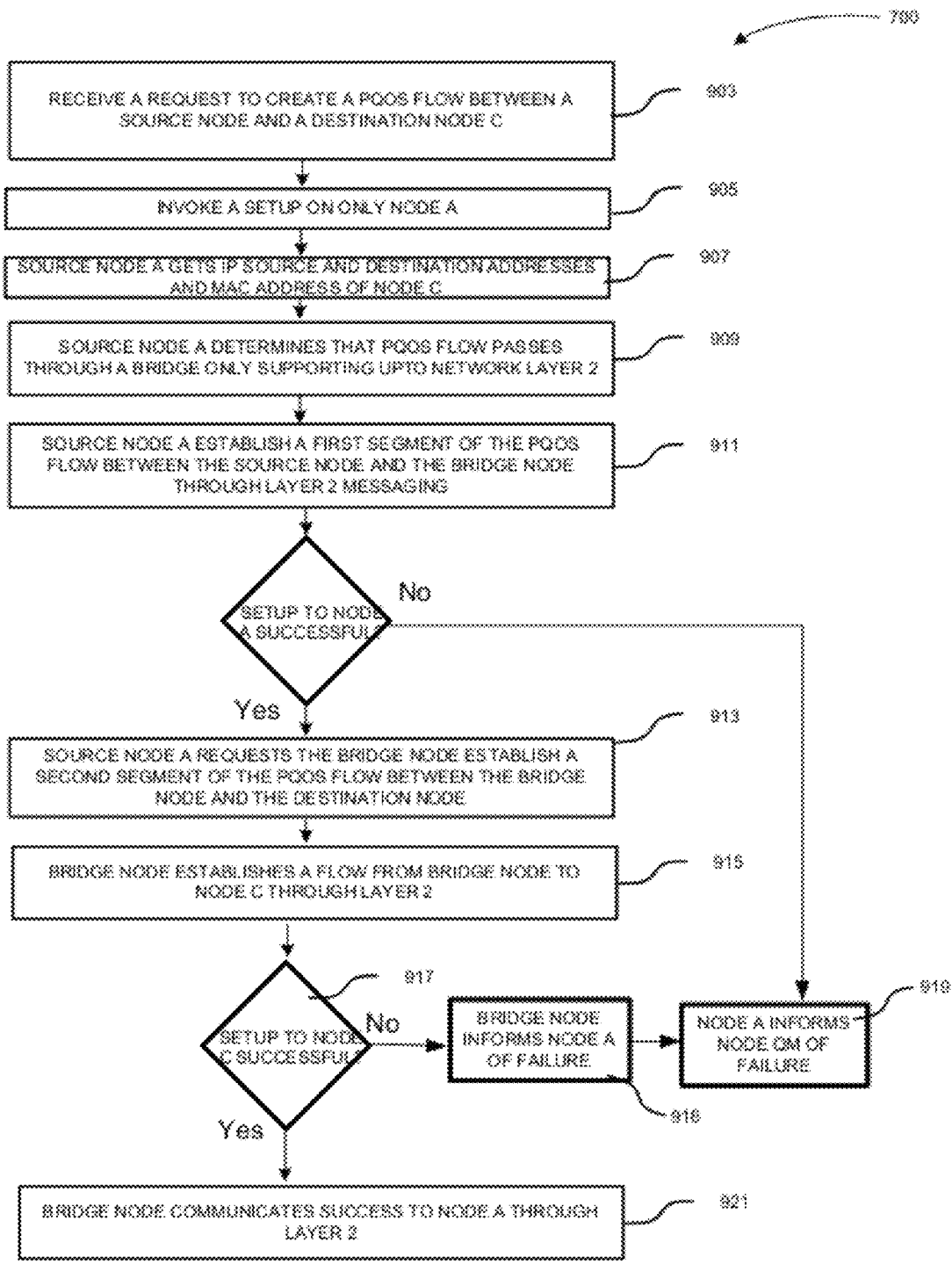
FIG. 9 is a flowchart illustrating an example method for creating a PQoS flow between a source node that supports high layer messaging and a destination node that lacks support for high layer messaging through a bridge node that lacks support for high layer messaging in accordance with one embodiment of the disclosed method and apparatus.

FIG. 9 illustrates a flowchart of the process 900. According to this embodiment, a control point (e.g., 125 shown in FIG. 2) sends a request to Node QM 815 (OPERATION 903) to create a PQoS flow AC 821 from Node A 812 to Node C 818. The request invokes a QoS setup action only on Node A 812 (OPERATION 905). Based on the invocation, source Node A 812 gets the IP source address and the IP destination address from Node QM 815, and the MAC address of destination Node C 818 (OPERATION 907). Then, using its CAM and Node C's MAC address, Node A 812 automatically learns that the traffic from Node A 812 to Node C 818 passes through the bridge node 809 (OPERATION 909). As a result, Node A's Data Link Layer 811 sets up a QPoS flow (i.e., first flow segment) from Node A 812 to the bridge node 809 over a first network segment 803, via layer 2 messaging mechanisms such as MoCA L2ME (OPERATION 911). Node A 812 also sends a layer 2 message to the bridge node 809, instructing the bridge to set up the next (i.e., second) segment of the flow from the bridge node 809 to destination Node C 818 over a second network segment 806 (OPERATION 913). The layer 2 message includes information like the TSpec for the PQoS flow AC 821 and the MAC address of the source node and the destination node.

Next, the bridge node 809, in turn, sets up a PQoS flow from the bridge node 809 to Node C 818 via layer 2 messaging mechanisms, such as those found in MoCA L2ME (OPERATION 915). By doing so, bridge node 809 commits the Port 827 to the PQoS flow between bridge node 809 and Node C 818, and Node C 818 commits its resources to the PQoS flow.

When the bridge node 809 has successfully set up its PQoS flow (i.e., second flow segment) between the bridge node 809 and Node C 818 (OPERATION 917), it will then communicate this success back to Node A 812 via layer 2 messaging (OPERATION 921). If the second segment fails, bridge node 809 information source Node A 812 of the failure (OPERATION 918). If either the first segment or the second segment fails, Node A 812 will inform Node QM 815 that the flow setup has failed (OPERATION 919). If both the first segment and the second segment succeeded, then Node A 812 will inform to the Node QM 815 of the success of the flow setup (i.e. the PQoS flow AC 821 has been successfully set up). In some embodiments, Node QM 815 then acknowledges to all the involved nodes and the control point 125 (shown in FIG. 2) that the PQoS flow AC 821 setup was successful. Alternatively, the Node QM 815 acknowledges that at least one of the segments has failed. In one embodiment, the Node QM 815 will wait to see whether the failed segments can be created. In one such embodiment, the Node QM 815 will wait a predetermined amount of time, at the end of which the Node QM 815 will indicate to the other nodes that the attempt to create the flow has been abandoned. In one embodiment, the Node QM 815 will abandon the attempt to create the flow without waiting for a failed segment to be successfully created. Once the Node QM 815 abandons the attempt to create the flow, a message will be sent to all of the involved nodes to allow each such node to release the resources that have been reserved for the PQoS flow.

Figure 10:
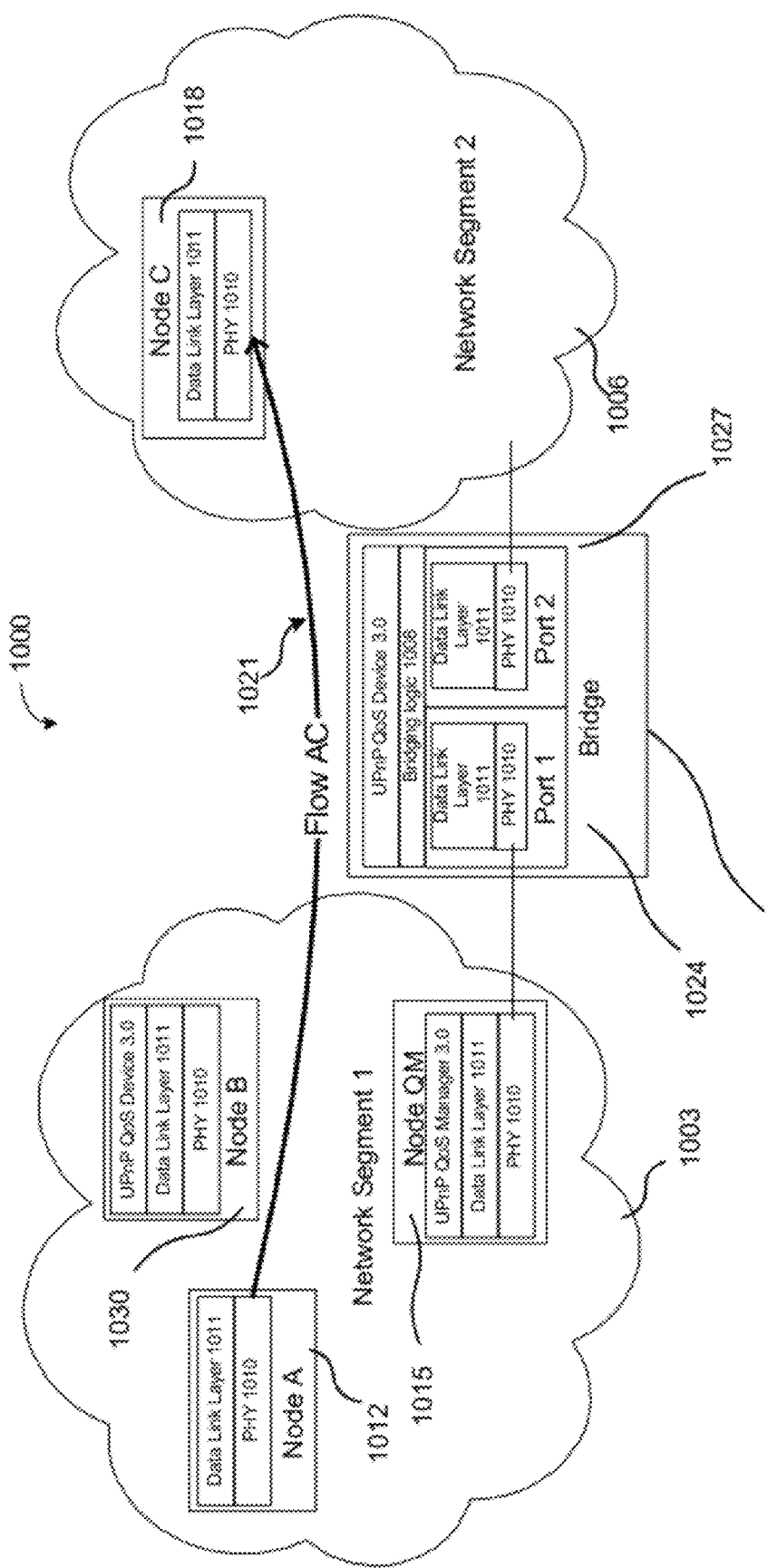
FIG. 10 is a diagram illustrating an example network on which a PQoS flow is created between a source node that lacks support for high layer messaging and a destination node that lacks support for high layer messaging through a bridge node that supports high layer messaging in accordance with one embodiment of the disclosed method and apparatus.

FIG. 10 is a diagram illustrating another example network on which a PQoS flow has been created in accordance with one embodiment of the disclosed method and apparatus. Diagram 1000 illustrates a PQoS flow AC 1021 from a source Node A 1012 on a first network segment 1003 to a destination Node C 1018 on a second network segment 1006. The flow 1021 passes through a bridge node 1009, which connects the two networks together using its Bridging Logic and its two network ports (Port 1 1024 connected to the first network segment 1003, and the Port 1027 connected to the second network segment 1006). A QoS management apparatus, such as a Node QM 1015 resides on the first network segment 1003 and functions as a UPnP QoS Manager (i.e., has a high layer QoS Management Service). As previously noted, a QoS Manager is a logic entity, and may be located anywhere on a network (in this case, on the first network segment 1003 in Node QM 1015). Furthermore, the QoS management apparatus can be coextensive with another functional apparatus.

As illustrated, Node A 1012, Node QM 1015, Node C 1018, and both bridge Ports 1024 and 1027 comprise a PHY layer 1010 and a Data Link Layer 1011. In the illustrated embodiment, both source node A 1009 and destination node C 1018 lack UPnP QoS Device Service (i.e., do not have a high layer QoS Management Service). Bridge nodes 1009 and Node QM 1015, on the other hand, are shown to support high layer messaging (i.e., do have a high layer QoS Device Service), with bridge node 1012 having a UPnP QoS Device Service, and Node QM 1015 functioning as a UPnP QoS Manager (i.e., having a high layer PQoS Management Service).

Figure 11:
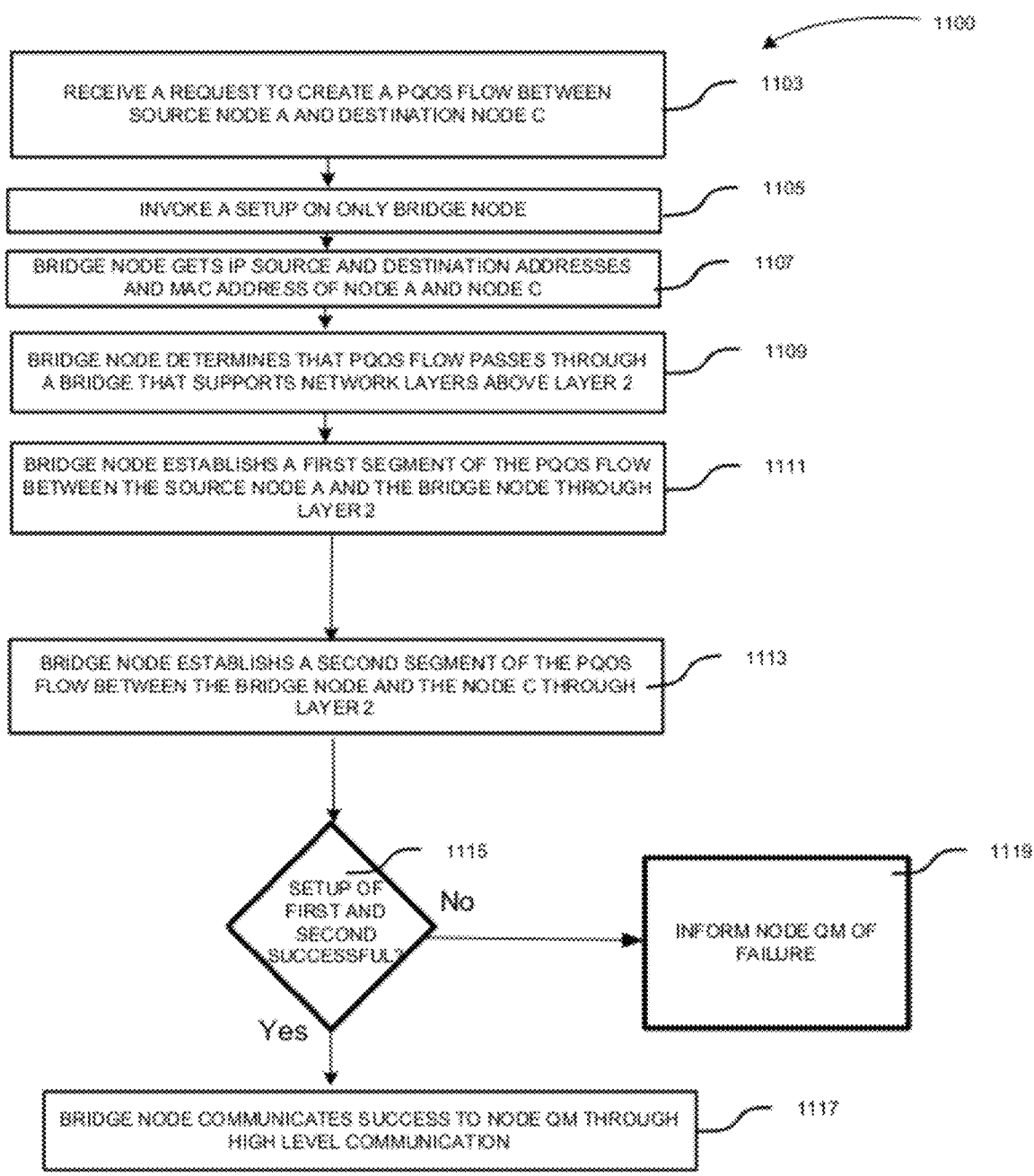
FIG. 11 is a flowchart illustrating an example method for creating a PQoS flow between a source node that lacks support for high layer messaging and a destination node that lacks support for high layer messaging through a bridge node that supports high layer messaging in accordance with one embodiment of the disclosed method and apparatus.

FIG. 11 is a flowchart of the process that is performed in connection with the architecture of FIG. 10. According to this embodiment, when Node QM 1015 receives a request from a control point (e.g., 125 shown in FIG. 2) to create a PQoS flow AC 1021 from Node A 1012 to Node C 1018 (OPERATION 1103), Node QM 1015 invokes a QoS setup action only on bridge node 1009 (OPERATION 1105). Based on the invocation, bridge node 1009 gets the IP source address and the IP destination address from Node QM 1015, and the MAC addresses of source Node A 1012 and destination Node C 1018 (OPERATION 1107). Then, using its CAM, Node A's MAC address and Node C's MAC address, bridge node 1009 automatically learns that the traffic from Node A 1012 to Node C 1018 passes through the bridge node 1009 (OPERATION 1109). As a result, bridge node 1009's Data Link Layer 1011 sets up a PQoS flow from Node A 1012 to the bridge node 1009 (i.e., first flow segment) over a first network segment 1003 (OPERATION 1111), and a PQoS flow from the bridge node 1009 to Node C 1018 (i.e. the second flow segment) over a second network segment 1006, via layer 2 messaging mechanisms such as MoCA L2ME (OPERATION 1113).

When the bridge node 1009 has successfully set up its PQoS flow on both the first segment and the second segment (OPERATION 1115), it will then communicate this success back to Node QM 1015 via high layer messaging (like UPnP QoS) (OPERATION 1117). If either the first segment or the second segment fails, the bridge node 1009 will inform Node QM 1015 that the flow setup has failed (OPERATION 1119). In some embodiments, Node QM 1015 then acknowledges to all the involved nodes and the control point that the PQoS flow AC 1021 setup was successful. Alternatively, the Node QM 1015 will acknowledge that the attempt to create the flow has failed. In one embodiment, the Node QM 1015 immediately abandons the attempt to create the flow. Alternatively, the Node QM 1015 waits a predetermined amount of time to see whether the failed segment can be successfully created before abandoning the attempt to create the flow. Once the Node QM 1015 abandons the attempt to create the flow, a message will be sent to all of the involved nodes to allow each such node to release the resources that have been reserved for the PQoS flow.

Figure 12:
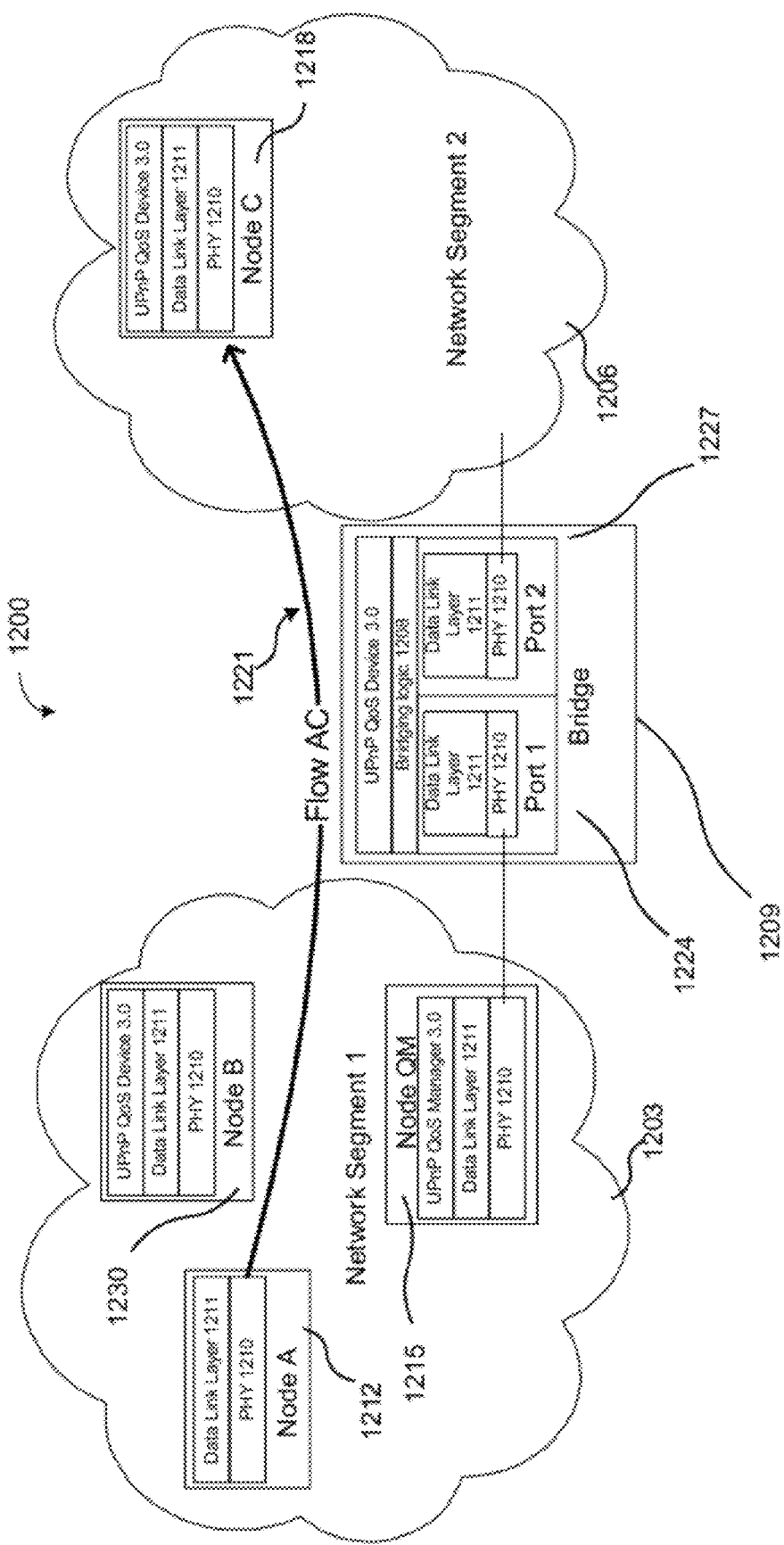
FIG. 12 a diagram illustrating an example network on which a PQoS flow is created between a source node that lacks support for high layer messaging and a destination node that supports high layer messaging through a bridge node that supports high layer messaging in accordance with one embodiment of the disclosed method and apparatus.

FIG. 12 is a diagram illustrating another example network on which a PQoS flow has been created in accordance with one embodiment of the disclosed method and apparatus. The only difference between this network and the one shown in FIG. 10 is that in this network the source node A 1212 does not have a UPnP QoS Device Service while the bridge node 1209, the destination node 1218 and a QoS management apparatus, such as a QoS Manager 1215, all have a UPnP QoS Device Service (i.e., have a high layer QoS Device Service). So this example can be seen as a special case of the example shown in FIG. 10, and the same method and apparatus can be used to set up a PQoS flow on both the first and second network segments 1203, 1206.

Figure 13:
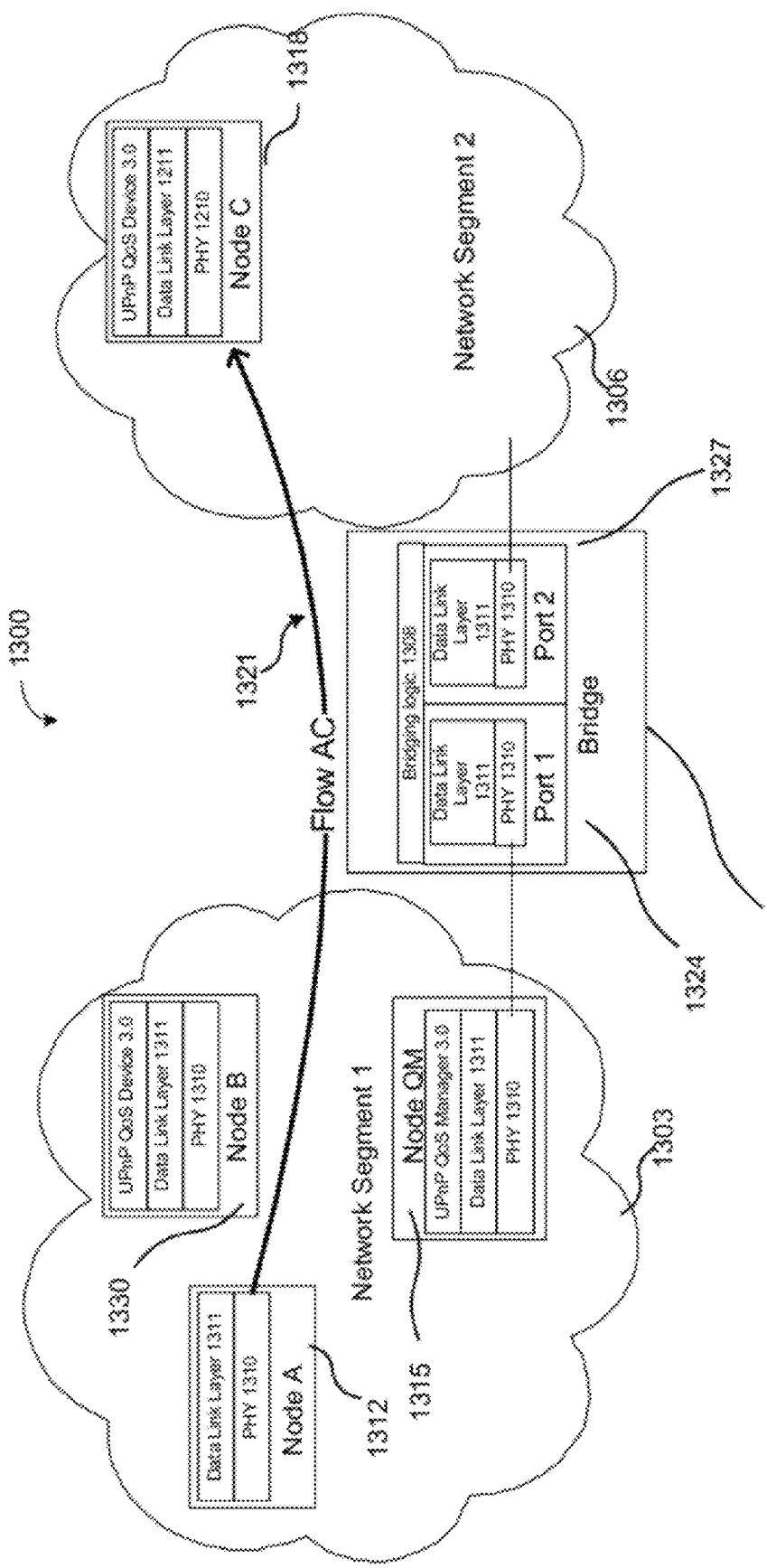
FIG. 13 a diagram illustrating an example network on which a PQoS flow is created between a source node that lacks support for high layer messaging and a destination node that supports high layer messaging through a bridge node that lacks support for high layer messaging in accordance with one embodiment of the disclosed method and apparatus.

FIG. 13 is a diagram illustrating another example network on which a PQoS flow has been created in accordance with one embodiment of the disclosed method and apparatus. The only difference between this network and the one shown in FIG. 8 is that in this network the source node A 1312 and the bridge node 1309 do not have a UPnP QoS Device Service while the destination node 1318 does have a UPnP QoS Device Service.

Figure 14:
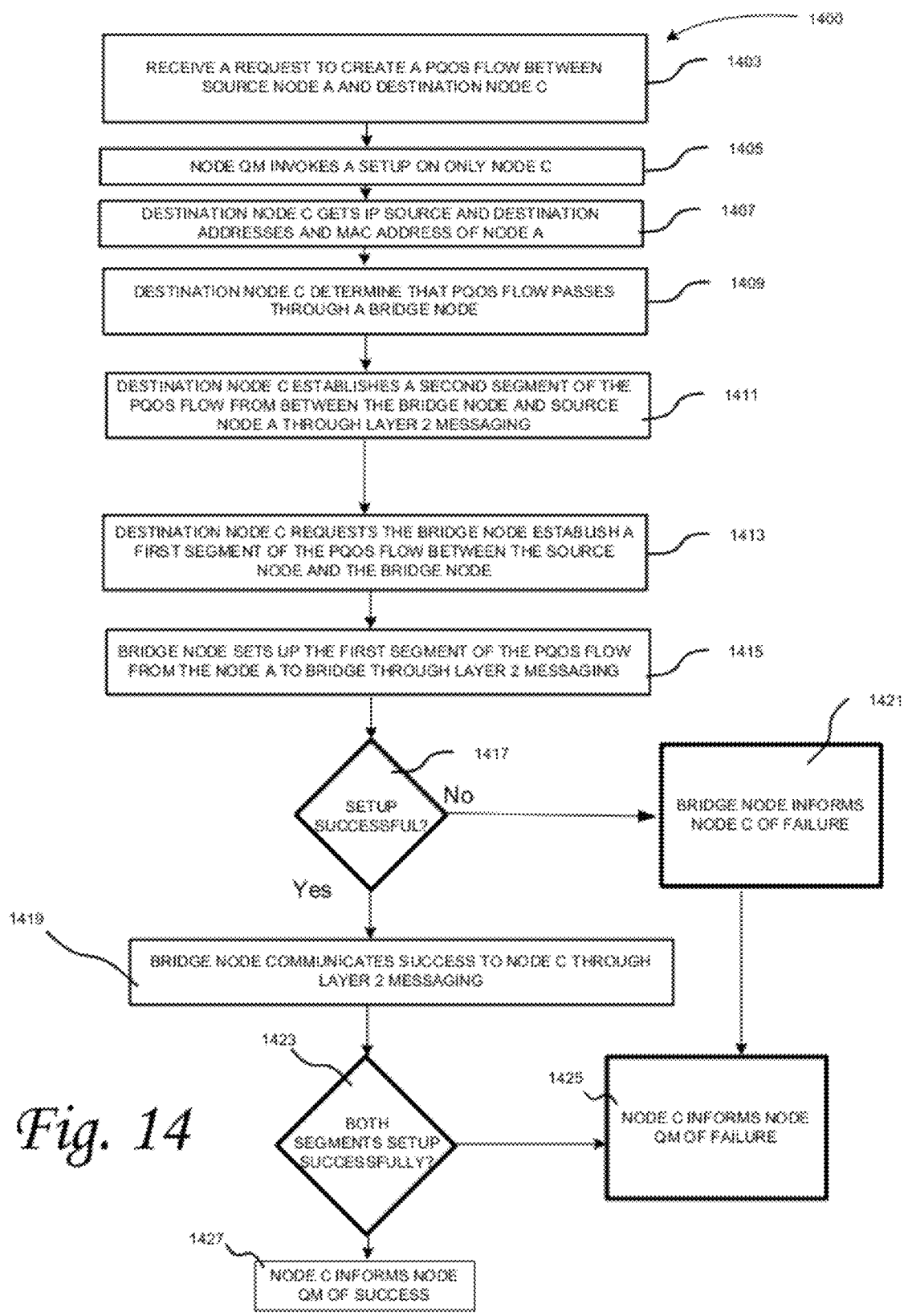
FIG. 14 is a flowchart illustrating an example method for creating a PQoS flow between a source node that lacks support for high layer messaging and a destination node that supports high layer messaging through a bridge node that lacks support for high layer messaging in accordance with one embodiment of the disclosed method and apparatus.

FIG. 14 illustrates the process that is performed in connection with the architecture shown in FIG. 13. According to this embodiment, when a QoS management apparatus, such as a Node QM 1315, receives a request from a control point (e.g., 125) to create a PQoS flow AC 1321 from Node A 1312 to Node C 1318 (OPERATION 1403), Node QM 1315 invokes a QoS setup action only on Node C 1318 (OPERATION 1405). As is the case in the embodiments disclosed above, the QoS management apparatus can be coextensive with another functional apparatus. Based on the invocation, Destination Node C 1318 gets the IP source address and the IP destination address from Node QM 1315, and the MAC address of source Node A 1312 (OPERATION 1407). Then, using its CAM and Node A's MAC address, Node C 1318 automatically learns that the traffic from Node A 1312 to Node C 1318 passes through the bridge node 1309 (OPERATION 1409). As a result, Node C's Data Link Layer 1311 sets up a PQoS flow from the bridge node 1309 to Node C 1318 (i.e., second segment), via layer 2 messaging mechanisms such as MoCA L2ME (OPERATION 1411). Node C 1318 (i.e., the requestor node) also sends a layer 2 message to the bridge node 1309, instructing the bridge node to set up the first segment of the flow from Node A 1312 to the bridge node 1309 (OPERATION 1413). The layer 2 message includes information like the TSpec for the PQoS flow AC 1321 and the MAC address of the source node and the destination node.

It should be noted that this "propagation" of the layer 2 commands to create additional segments of the flow could be repeated through several such segments in which the both nodes of the segment do not have a high layer QoS Device Service.

Next, the bridge node 1309, in turn, sets up a PQoS flow from Node A 1312 to the bridge node 1309 via layer 2 messaging mechanisms, such as those found in MoCA L2ME 609 (OPERATION 1415). By doing so, bridge node 1309 commits the Port 1324 to the PQoS flow between Node A 1312 and bridge node 1309, and Node A 1312 commits its resources to the PQoS flow.

If the bridge node 1309 has successfully set up its PQoS flow (i.e., first flow segment) between Node A 1312 and the bridge node 1309 (OPERATION 1417), it will then communicate this success back to Node C 1318 via layer 2 messaging (OPERATION 1419). Otherwise, the bridge node 1309 will communicate to Node C that the attempt failed (OPERATION 1421). If either the first segment or the second segment fails (OPERATION 1423), Node C 1318 will inform Node QM 1315 that the flow setup has failed (OPERATION 1425). If both the first segment and the second segment succeeded, then Node C 1318 will inform to Node QM 1315 the success of the flow setup (i.e. the PQoS flow AC 1321 has been successfully set up) (OPERATION 1427). In some embodiments, Node QM 1315 then acknowledges to all the involved nodes and the control point that the PQoS flow AC 1321 setup was successful. Alternatively, the Node QM 1315 will acknowledge that the attempt to create the flow has failed. In one embodiment, the Node QM 1315 immediately abandons the attempt to create the flow. Alternatively, the Node QM 1315 waits a predetermined amount of time to see whether the failed segment can be successfully created before abandoning the attempt to create the flow. Once the Node QM 1315 abandons the attempt to create the flow, a message will be sent to all of the involved nodes to allow each such node to release the resources that have been reserved for the PQoS flow.

Figure 15:
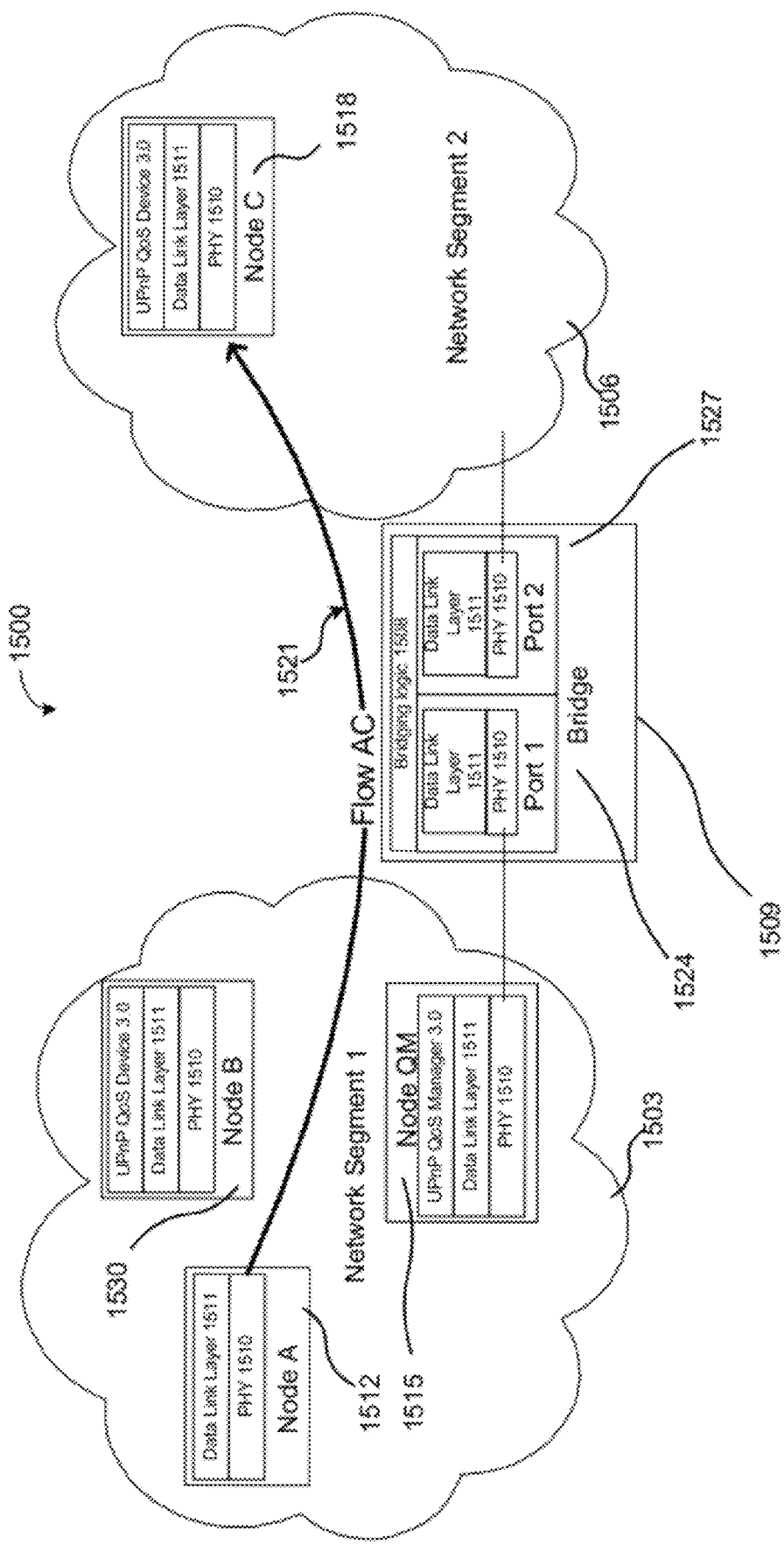
FIG. 15 is a diagram illustrating an example network on which a PQoS flow is created between a source node that lacks support for high layer messaging and a destination node that supports high layer messaging through a bridge node that lacks support for high layer messaging using an intermediary node that supports high layer messaging as a proxy node for the source node in accordance with one embodiment of the disclosed method and apparatus.

FIG. 15 is a diagram illustrating an example network on which a PQoS flow has been created in accordance with one embodiment of the disclosed method and apparatus using a proxy node. Diagram 1500 illustrates a PQoS flow AC 1521 from a source Node A 1512 on a first network segment 1503 to a destination Node C 1518 on a second network segment 1506. The flow 1521 passes through a bridge node 1509, which connects the two networks together using its bridging logic and its two network ports. The first Port 1524 is connected to the first network segment 1503. The second Port 1527 is connected to the second network segment 1506. A QoS management apparatus, such as a Node QM 1515 having a high layer QoS Management Service, resides on the first network segment 1503 and functions as a UPnP QoS Manager. As previously noted, a QoS Manager is a logic entity and may be located anywhere on a network (in this case, on the first network segment 1503 in Node QM 1515). Furthermore, the QoS management apparatus can be coextensive with another functional apparatus. Node B 1530 is another node present on the first network segment 1503. Node B 1530 serves as proxy for Node A 1512 when setting up PQoS flow AC 1521.

As illustrated, Node A 1512, Node B 1530, Node QM 1515, Node C 1518, and both bridge ports 1524 and 1527 each have a PHY layer 1510 and a Data Link Layer 1511. In the illustrated embodiment, Node A 1512 and the bridge node 1509 both lack UPnP QoS Device Service (i.e., do not have a high layer QoS Device Service). Nodes B 1530, QM 1515, and C 1518 have high layer messaging and both Node B 1530 and Node C 1518 having UPnP QoS Device Services (i.e., having a high layer QoS Device Service), and Node QM 1515 functioning as a UPnP QoS Manager.

Figure 16:
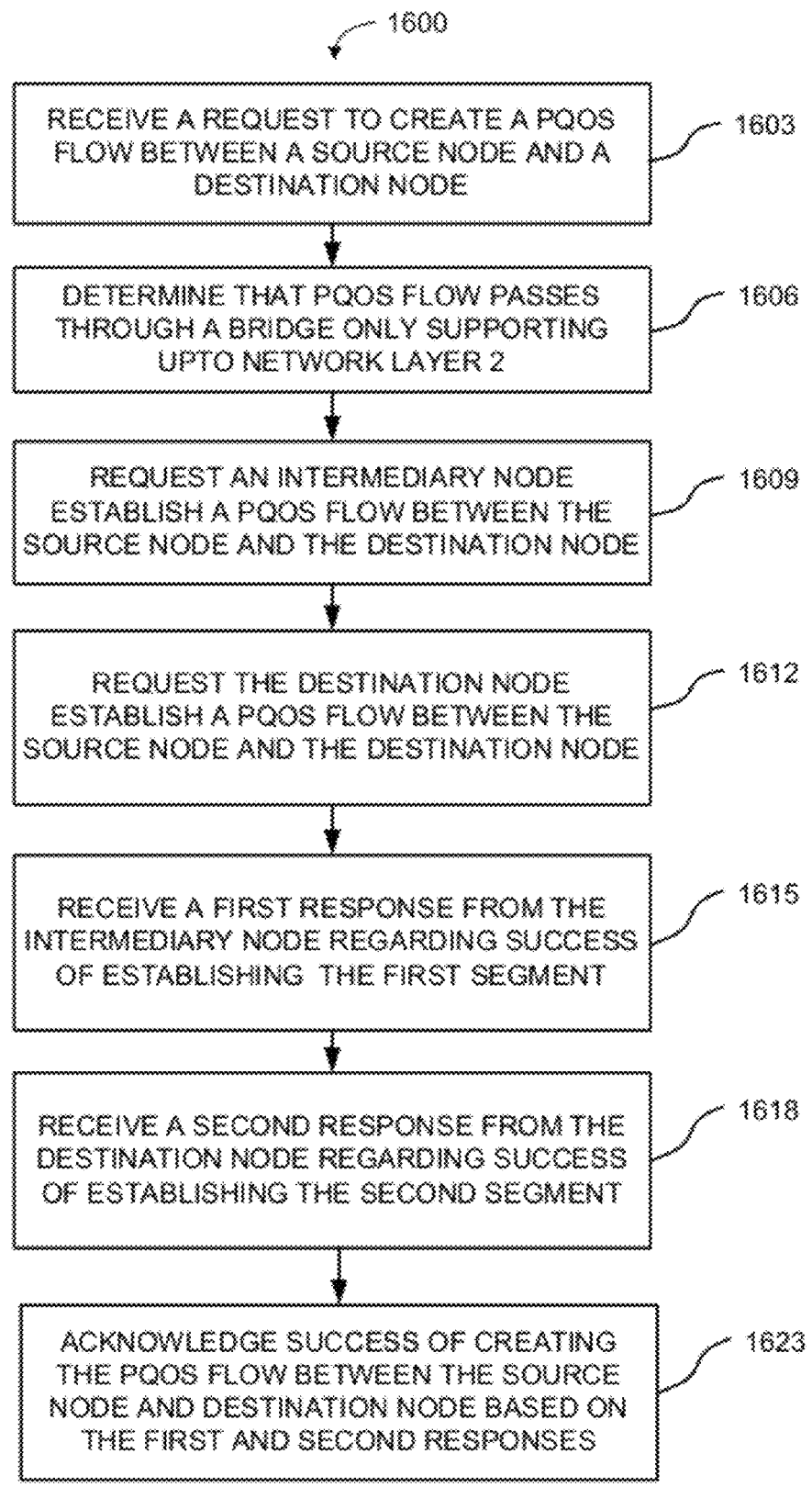
FIG. 16 is a flowchart illustrating an example method by which a QoS management node creates a PQoS flow from the source node on the first network segment that lacks support for high layer messaging to a destination node that lacks support for high layer messaging on the second network segment using an intermediary node that supports high layer messaging as a proxy node for the source Node.

FIG. 16 is a flowchart illustrating an example method 1600 by which Node QM 1515 can create a PQoS flow AC 1521 from the source Node A 1512 that lacks a UPnP QoS Device Service, the source Node A 1512 being on the first network segment 1503. The PQoS flow AC 1521 is created to the destination Node C 1518 on the second network segment 1506. The flow is created using intermediary Node B 1530, which has UPnP QoS Device Service as a proxy node for Node A 1512. Method 1600 begins with the QoS Manager (Node QM 1515) receiving a request to create a PQoS flow between source Node A 1512 and destination Node C 1518 (OPERATION 1603). Node QM 1515 determines that the PQoS flow AC 1521 passes through bridge node 1509 (OPERATION 1606). Node QM 1515 requests that the intermediary Node B 1530 create the PQoS flow AC 1521 between Node A 1512 and Node C 1518 on behalf of Node A 1512 (OPERATION 1609). The QM Node 1515 also requests that the destination Node C 1518 create the PQoS flow AC 1521 between Node A 1521 and Node C 1518 (OPERATION 1612). In one embodiment, Node B 1530 operates on behalf Node A 1512 using layer 2 messaging mechanisms, such as MoCA L2ME. For example, in one embodiment, using MoCA L2ME, Node B 1530 functions as an entry node for Node A 1512, and creates and updates PQoS flow transactions by submitting L2ME messages to the NC on behalf of Node A 1512.

In one embodiment, when Node QM 1515 requests that Node B 1530 create the PQoS flow AC 1521 from Node A 1512 to Node C 1518 and Node B 1530 attempts to fulfill the request, Node B 1530 will automatically learn that the PQoS flow AC 1521 passes through bridge node 1509 and, as a result, will create the first segment of the PQoS flow AC 1521 between Node A 1512 and the bridge node 1509.

Similarly, when Node QM 1515 requests that Node C 1518 create the PQoS flow AC 1521 from Node A 1512 to Node C 1518 and Node C 1518 attempts to fulfill the request, Node C 1518 will automatically learn that the PQoS flow AC 1521 passes through bridge node 1509 and, as a result, Node C 1518 will create the first segment of the PQoS flow AC 1521 between Node C 1518 and the bridge node 1509.

It should be noted that in one embodiment, when a request is sent from Node QM 1515 to Node B 1530 and Node C 1518, the request may be broadcast to all the nodes on the first network segment 1503 and the second network segment 1506. In one embodiment, once the request is received by all the nodes on the network segments, only the nodes implicated by the broadcasted request (in this case Node B 1530 on behalf of Node A 1512, and Node C 1518) may respond back to Node QM's 1515 request.

Continuing with reference to FIG. 16, once the first segment of the PQoS flow AC 1521 has been successfully created, Node QM 1515 receives a first response acknowledging the success in creating the first segment (OPERATION 1615). The first response is sent from the intermediary Node B 1530. Similarly, once the second segment of the PQoS flow AC 1521 has been successfully created, Node QM 1515 receives from the destination Node C 1518 a second response acknowledging the success in creating the second segment (OPERATION 1618).

In response to the acknowledgment of success conveyed by the first and second responses, Node QM 1515 acknowledges the success of creating PQoS flow AC 1521 (OPERATION 1621). One way Node QM 1515 may acknowledge this success is by informing those nodes involved in the PQoS flow AC (i.e., Node B 1530 and Node C 1518) of its successful creation. Node QM 1515 also acknowledges this success by sending a message to the control point which initially requested the QoS Manager to set up the PQoS flow. Alternatively, the Node QM 1515 will acknowledge that the attempt to create the flow has failed. In one embodiment, the Node QM 1515 immediately abandons the attempt to create the flow. Alternatively, the Node QM 1515 waits a predetermined amount of time to see whether the failed segment can be successfully created before abandoning the attempt to create the flow. Once the Node QM 1515 abandons the attempt to create the flow, a message will be sent to all of the involved nodes to allow each such node to release the resources that have been reserved for the PQoS flow.

It should be noted that in other embodiments, the proxy functionality performed by intermediary Node B 1530 in FIG. 15 could be implemented in another intermediary node (Node C 1550, not shown) located in the same segment as Node C 1518, and is utilized to set up PQoS flows between the bridge node 1509 and destination Node C 1518 on behalf of Node C 1518. In further embodiments, the proxy functionality performed by intermediary Node B 1530 and Node C 1550 in FIG. 15 could be concurrently utilized on behalf of both Node A 1512 and Node C 1518.

According to an alternative embodiment, when Node QM 1515 receives a request from a control point (e.g., 125) to create a PQoS flow AC 1521 from Node A 1512 to Node C 1518, Node QM 1515 invokes a QoS setup action on intermediary Node B 1530, on behalf of Node A 1512, and Node C 1518. Based on the invocation, intermediary Node B 1530 gets the IP source address and the IP destination address from Node QM 1515, and the MAC address of destination Node C 1518. Then, using its CAM and Node C's MAC address, Node B 1530 automatically learns that the traffic from Node A 1512 to Node C 1518 passes through the bridge node 1509. As a result, Node B's Data Link Layer 1511 sets up a PQoS flow (i.e., first flow segment) from Node A 1512 to the bridge node 1509 using layer 2 messaging, such as MoCA L2ME. Node B's Data Link Layer 1511 may also instruct the bridge node 1509 to commit its network resources to the flow (i.e., first flow segment) via layer 2 messaging mechanisms. For example, on a MoCA network, Node B's Data Link Layer 1511 could facilitate the bridge node 1509 committing its Port 1528 to the first segment flow by using MoCA L2ME messages.

Similarly, based on the invocation, destination Node C 1518 gets the IP source address and the IP destination address from Node QM 1515, and the MAC address of source Node A 1512. Then, using its CAM and Node A's MAC address, Node C 1518 automatically learns that the traffic from Node A 1512 to Node C 1518 passes through the bridge node 1509. Node C's Data Link Layer 1511, then sets up a PQoS flow (i.e., second flow segment) from the bridge node 1509 to Node C 1518, with necessary network and node resources, which may include the bridge node committing its network resources to the flow via layer 2 messaging mechanisms. Again, on a MoCA network, Node C's Data Link Layer 1511 could facilitate the bridge node 1509 committing its Port 1527 to the second segment flow by using MoCA L2ME messages.

Subsequently, both Node B 1530 and Node C 1518 will individually inform Node QM 1515 whether their respective segment flows, first flow segment for Node B 1530 and second flow segment for Node C 1518, were successfully set up. If otherwise, an error message may be returned to Node QM 1515. Once both Node B 1530 and Node C 1518 acknowledge to Node QM 1515 the success of their respective flow setup, the PQoS flow AC 1521 has been successfully set up. In some embodiments, Node QM 1515 then acknowledges to all the involved nodes and the control point that the PQoS flow AC 1521 setup was successful. Alternatively, the Node QM 1515 will acknowledge that the attempt to create the flow has failed. In one embodiment, the Node QM 1515 immediately abandons the attempt to create the flow. Alternatively, the Node QM 1515 waits a predetermined amount of time to see whether the failed segment can be successfully created before abandoning the attempt to create the flow. Once the Node QM 1515 abandons the attempt to create the flow, a message will be sent to all of the involved nodes to allow each such node to release the resources that have been reserved for the PQoS flow.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Figure 17:
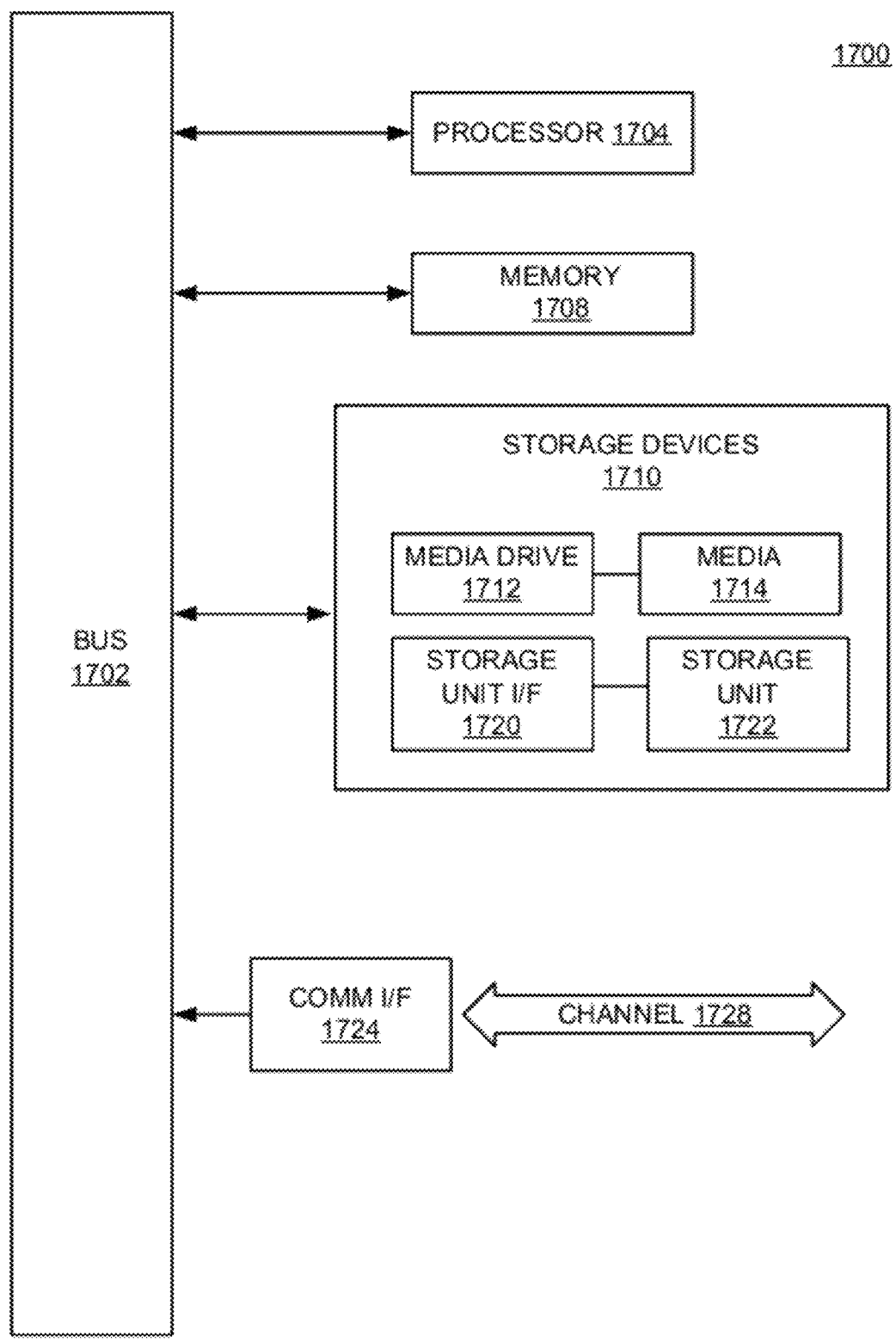
FIG. 17 is a diagram illustrating an exemplary computing module that may be used in implementing various features of embodiments of the disclosed methods and apparatus.

In one embodiment, when components or modules are implemented in whole or in part using software, these software elements can be implemented using any computing or processing module capable of carrying out the described functionality. One example of such a computing module is shown in FIG. 17. Various embodiments of the disclosed method and apparatus include this computing module 1700. After reading this description, it will become apparent to a person skilled in the relevant art how to implement the disclosed method and apparatus using both this computing module and other computing modules or architectures as well.

Referring now to FIG. 17, in one embodiment, the computing module 1700 may represent computing or processing capabilities found within: desktop, laptop, notebook computers, hand-held computing devices (PDA's, smart phones, cell phones, palmtops, etc.), mainframe computers, supercomputers, workstations, servers, or any other type of special-purpose or general-purpose computing devices, as may be desirable or appropriate to perform the described functionality for a given application or environment. The computing module 1700 might also represent computing capabilities embedded within or otherwise available to a given device. For example, a computing module 1700 might be found in or implemented by electronic devices such as digital cameras, navigation systems, cellular telephones, portable computing devices, modems, routers, wireless access points (WAPs), terminals and other electronic devices that might include some form of processing capability.

The computing module 1700 might include, for example, one or more processors, controllers, control modules, or other processing devices, such as a processor 1704. The processor 1704 might be implemented using a general-purpose or special-purpose processing engine such as, for example, a microprocessor, controller, or other control logic. In the illustrated example, the processor 1704 is connected to a bus 1702, although any communication medium can be used to facilitate interaction with other components of the computing module 1700 or to communicate externally.

The computing module 1700 might also include one or more memory modules, simply referred to herein as the main memory 1708. In one embodiment, random access memory (RAM) or other dynamic memory might be used for storing information and instructions to be executed by the processor 1704. The main memory 1708 might also be used for storing temporary variables or other intermediate information during execution of instructions to be executed by the processor 1704. The computing module 1700 might likewise include a read only memory ("ROM") or other storage device coupled to bus 1702 for storing information and instructions for the processor 1704.

The computing module 1700 might also include one or more mechanisms for information storage 1710, which might include, for example, a media drive 1712 and a storage unit interface 1720. The media drive 1712 might include a drive or other mechanism to support fixed or removable storage media 1714. For example, a hard disk drive, a floppy disk drive, a magnetic tape drive, an optical disk drive, a CD or DVD drive (R or RW), or other removable or fixed media drive might be provided. Accordingly, storage media 1714 might include, for example, a hard disk, a floppy disk, magnetic tape, cartridge, optical disk, a CD or DVD, or other fixed or removable medium that is read by, written to or accessed by media drive 1712. As these examples illustrate, the storage media 1714 can include a computer usable storage medium having stored therein computer software or data.

In alternative embodiments, information storage mechanism 1710 might include other similar instrumentalities for allowing computer programs or other instructions or data to be loaded into the computing module 1700. Such instrumentalities might include, for example, a fixed or removable storage unit 1722 and an interface 1720. Examples of such storage units 1722 and interfaces 1720 can include a program cartridge and cartridge interface, a removable memory (for example, a flash memory or other removable memory module) and memory slot, a PCMCIA slot and card, and other fixed or removable storage units 1722 and interfaces 1720 that allow software and data to be transferred from the storage unit 1722 to the computing module 1700.

The computing module 1700 might also include a communications interface 1724. Communications interface 1724 might be used to allow software and data to be transferred between the computing module 1700 and external devices. Examples of communications interface 1724 might include a modem or soft modem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1724 might typically be carried on signals, which can be electronic, electromagnetic (which includes optical) or other signals capable of being exchanged by a given communications interface 1724. These signals might be provided to communications interface 1724 via a channel 1728. This channel 1728 might carry signals and might be implemented using a wired or wireless communication medium. Some examples of a channel might include a MoCA channel over coaxial cable, phone line, a cellular link, an RF link, an optical link, a network interface, a local or wide area network, and other wired or wireless communications channels.

It should be clear from the broad scope of processing and storage devices disclosed, that any devices that can perform the functions disclosed would be within the scope of the disclosed method and apparatus.

In this document, the terms "computer program medium" and "computer usable medium" are used to generally refer to physical storage media such as, for example, memory 1708, storage unit 1722, and media 1714. These and other various forms of computer program storage media or computer usable storage media may be involved in storing and providing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1700 to perform features or functions of the disclosed method and apparatus as discussed herein.

While various embodiments of the disclosed method and apparatus have been described above, it should be understood that they have been presented by way of example only, and not of limitation. Likewise, the various diagrams may depict an example architectural or other configuration for the disclosed method and apparatus, which is done to aid in understanding the features and functionality that can be included in the disclosed method and apparatus. The claimed invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the blocks are presented herein shall not mandate that various embodiments be implemented to perform the recited functionality in the same order unless the context dictates otherwise.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

What is claimed is:

1. A node configured to provide a high-layer quality-of-service (QoS) management service, the node comprising:
   a) a processor; and
   b) a memory coupled to the processor on which is stored computer executable code, which when executed by the processor, causes the node to:
      i) receive, via high-layer messaging, a request to create a parameterized quality-of-service (PQoS) flow between a source node of a first network and a destination node of a second network;
      ii) determine that the PQoS flow involves a bridge node that does not have a high layer QoS Device Service;
      iii) determine that the source node is adjacent the bridge node and has a high layer QoS Device Service;
      iv) determine that the destination node is adjacent the bridge node and has a high layer QoS Device Service;
      v) request, via high-layer messaging, that the source node establish a first segment of the PQoS flow between the source node and the bridge node using layer 2 messaging controlled by source node and that the destination node establish a second segment of the PQoS flow between the destination node and the bridge node using layer 2 messaging controlled by destination node;
      vi) receive, via high-layer messaging, a response from the source node acknowledging whether the first segment of the PQoS flow was successfully established;
      vii) receive, via high-layer messaging, a response from the destination node acknowledging whether the second segment of the PQoS flow was successfully established; and
      viii) in response to receipt of the response from the source node and the destination node, acknowledging the status of the PQoS flow between the source node of the first network and the destination node of the second network.

2. The node of claim 1, wherein acknowledging the status of the PQoS flow includes sending to a control point from which the request to create the PQoS flow from the source node to the destination node was sent, the status of each segment that is required to create the requested PQoS flow from the source to the destination node.

3. The node of claim 1, wherein the stored computer executable code further causes the node to:
   a) receive, via high-layer messaging, an aggregated response from the source node acknowledging whether both the first segment of the PQoS flow and the second segment of the PQoS flow were successfully created using layer-2 messaging; and
   b) in response to receipt of the aggregated response, acknowledge that the PQoS flow was successfully created.

4. The node of claim 1, wherein the node configured to provide a high-layer QoS management service is the source node of the first network.

5. The node of claim 1, wherein the node configured to provide a high layer QoS management service is the destination node of the second network.

6. An integrated circuit chip for network communication, the integrated circuit chip having a high layer Quality of Service (QoS) Device Service and performing the operations of:
   a) receiving, via high-layer messaging, a request to create a parameterized quality-of-service (PQoS) flow between a source node of a first network and a destination node of a second network; b) determining that the PQoS flow involves a first bridge node that does not have a high layer QoS Device Service; c) determining that the source node is adjacent to the bridge node and has a high layer QoS Device Service; d) determining that the destination node is adjacent to the bridge node and has a high layer QoS Device Service; e) requesting, via high-layer messaging, that the source node establish a first segment of the PQoS flow between the source node and bridge node; f) requesting, via high-layer messaging, that the destination node establish a second segment of the PQoS flow between the destination node and the bridge node; g) receiving, via high-layer messaging, a response from the source node acknowledging whether the first segment of the PQoS flow was successfully established; h) receiving, via high-layer messaging, a response from the destination node acknowledging whether the second segment of the PQoS flow was successfully established; and i) in response to receipt of the response, acknowledging that the PQoS flow was successfully created.

7. The integrated circuit chip of claim 6, wherein the integrated circuit chip is further configured to perform the operations of:
   a) receiving, via high-layer messaging, an aggregated response from the source node acknowledging whether both the first segment of the PQoS flow and the second segment of the PQoS flow were successfully established using layer-2 messaging; and
   b) in response to receipt of the aggregated response, acknowledging that the PQoS flow was successfully created.

8. The integrated circuit of claim 6, wherein the integrated circuit is within the source node of the first network.

9. The integrated circuit of claim 6, wherein the integrated circuit is within the destination node of the second network.

* * * * *